United States Patent [19]

Inoue

[11] Patent Number: 5,418,937
[45] Date of Patent: May 23, 1995

[54] MASTER-SLAVE TYPE MULTI-PROCESSING SYSTEM WITH MULTICAST AND FAULT DETECTION OPERATIONS HAVING IMPROVED RELIABILITY

[75] Inventor: Atsushi Inoue, Kanagawa, Japan

[73] Assignee: Kabushiki Kaisha Toshiba, Kawasaki, Japan

[21] Appl. No.: 801,648

[22] Filed: Dec. 2, 1991

[30] Foreign Application Priority Data

Nov. 30, 1990 [JP] Japan .................. 2-330328

[51] Int. Cl.⁶ .................. G06F 11/00; G06F 1/00
[52] U.S. Cl. .................. 395/575; 364/228.7; 364/230; 364/DIG. 1; 371/16.5
[58] Field of Search .................. 395/575, 800, 425; 371/14, 16.5, 20.1; 364/228.7, 228.8, 228.7, 229.1, 230, 230.4, 230.3

[56] References Cited

U.S. PATENT DOCUMENTS

| | | | |
|---|---|---|---|
| 3,229,260 | 3/1967 | Falkoff | 364/200 |
| 4,414,624 | 11/1983 | Summer, Jr. et al. | 364/200 |
| 4,453,210 | 6/1984 | Suzuki et al. | 364/200 |
| 4,807,224 | 2/1989 | Naron et al. | 364/200 |
| 4,809,168 | 2/1989 | Hennessy et al. | 364/200 |
| 4,965,718 | 10/1990 | George et al. | 364/200 |
| 5,056,000 | 10/1991 | Chang | 364/200 |
| 5,239,654 | 8/1993 | Ing-Simmons et al. | 395/800 |

OTHER PUBLICATIONS

Barlett, J. F. "A NonStop Kernel" Proc. 8th Symp. on Operating System Principle pp. 22–29 Dec. 1981.
Borg. A. J. Bausbach and S. Glazer "A Message System Supporting Fault Tolerance", Proc. 9th ACM Symp. Operating System Principles Oct. 1983.

*Primary Examiner*—Robert W. Beausoliel, Jr.
*Assistant Examiner*—Norman M. Wright
*Attorney, Agent, or Firm*—Oblon, Spivak, McClelland, Maier & Neustadt

[57] ABSTRACT

A multi-processor system capable of realizing a multicast operation and a check event operation at high speed and high reliability, capable of clearly identifying the malfunctioning processor quickly regardless of a type of the malfunction processor. To realize the multicast operation, the system includes a multicast operation unit in which multicast data to be transferred from the master processor to the slave processors, control data provided in correspondence with the slave processors, and a multicast identification data for identifying a multicast point in the program corresponding to the multicast data are memorized, such that each of the slave processors obtains desired multicast data for desired multicast point according to the memorized multicast data, control data, and multicast identification data. To realize the check event operation, the system includes a check event operation unit in which check data provided in correspondence with the slave processors and an event identification data for identifying a check point in the program corresponding to the check data are memorized, such that each of the slave processors checks a present check point according to the memorized check data and event identification.

36 Claims, 17 Drawing Sheets

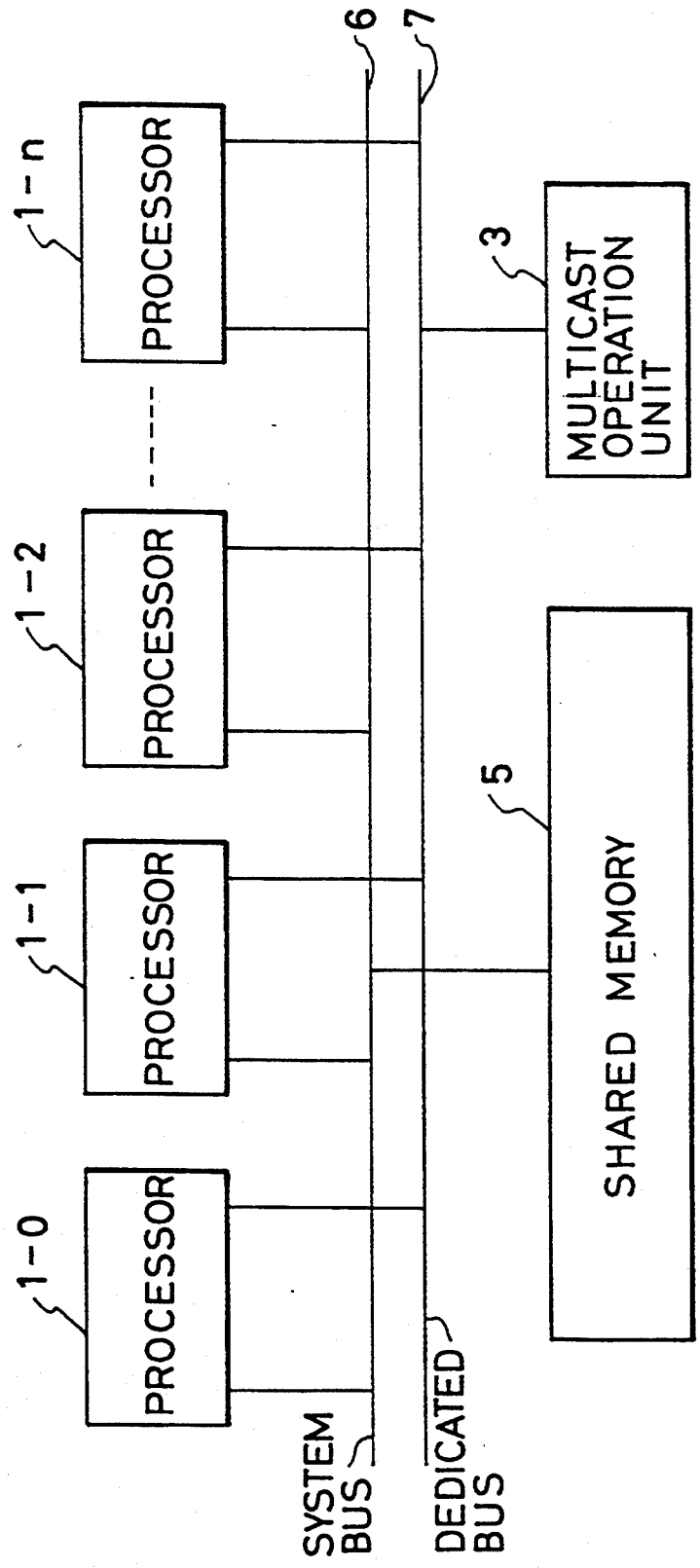
F I G. 2

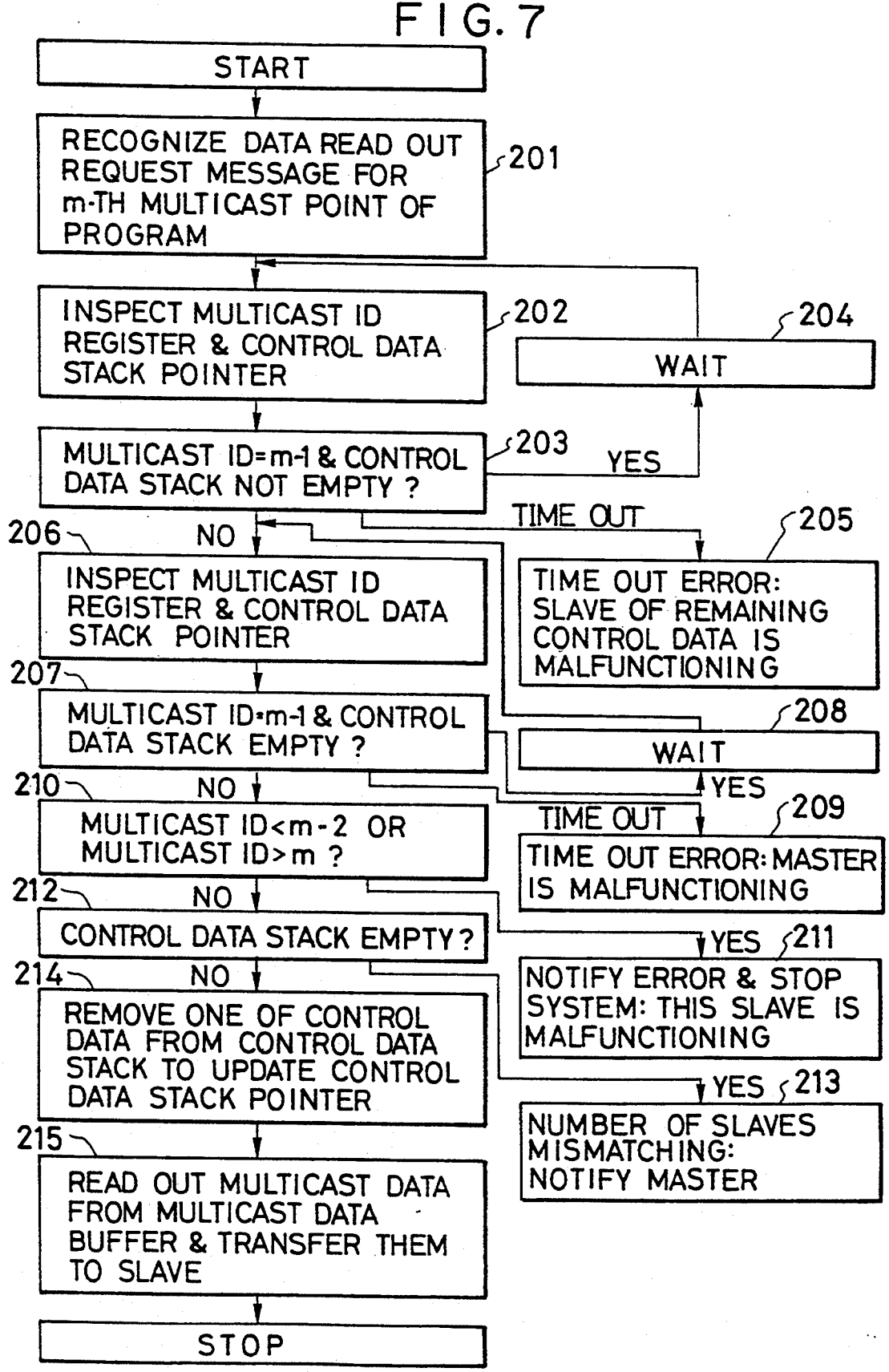

FIG. 8

| MASTER PROCESSOR SIDE | | |
|---|---|---|
| SYSTEM STAGE | SITUATION | OPERATION |
| CONTROL DATA STACK NOT EMPTY | PREVIOS MULTICAST DATA STILL REMAINING | WAIT, OR NOTIFY ERROR TO MASTER PROCESSOR |
| CONTROL DATA STACK EMPTY | NORMAL | COPY DATA, STORE MULTICAST ID & CONTROL DATA |

| SLAVE PROCESSOR SIDE (SEQUENTIALLY FROM TOP TO BOTTOM) | | |
|---|---|---|
| SYSTEM STAGE | SITUATION | OPERATION |
| MULTICAST ID = m−1 | SLAVE NOT RECEIVING PREVIOUS MULTICAST DATA EXISTS | WAIT, OR NOTIFY ERROR TO SLAVE PROCESSOR |
| MULTICAST ID < m−2 OR MULTICAST ID > m | INCORRECT REQUEST | NOTIFY ERROR TO REQUESTING SLAVE, OR STOP SYSTEM |
| CONTROL DATA STACK NOT EMPTY | NORMAL | DATA READ OUT & REMOVE ONE OF CONTROL DATA |
| CONTROL DATA STACK EMPTY | SLAVE NUMBER MISMATCHING | NOTIFY MASTER PROCESSOR, OR REJECT READ OUT REQUEST, OR STOP SYSTEM |

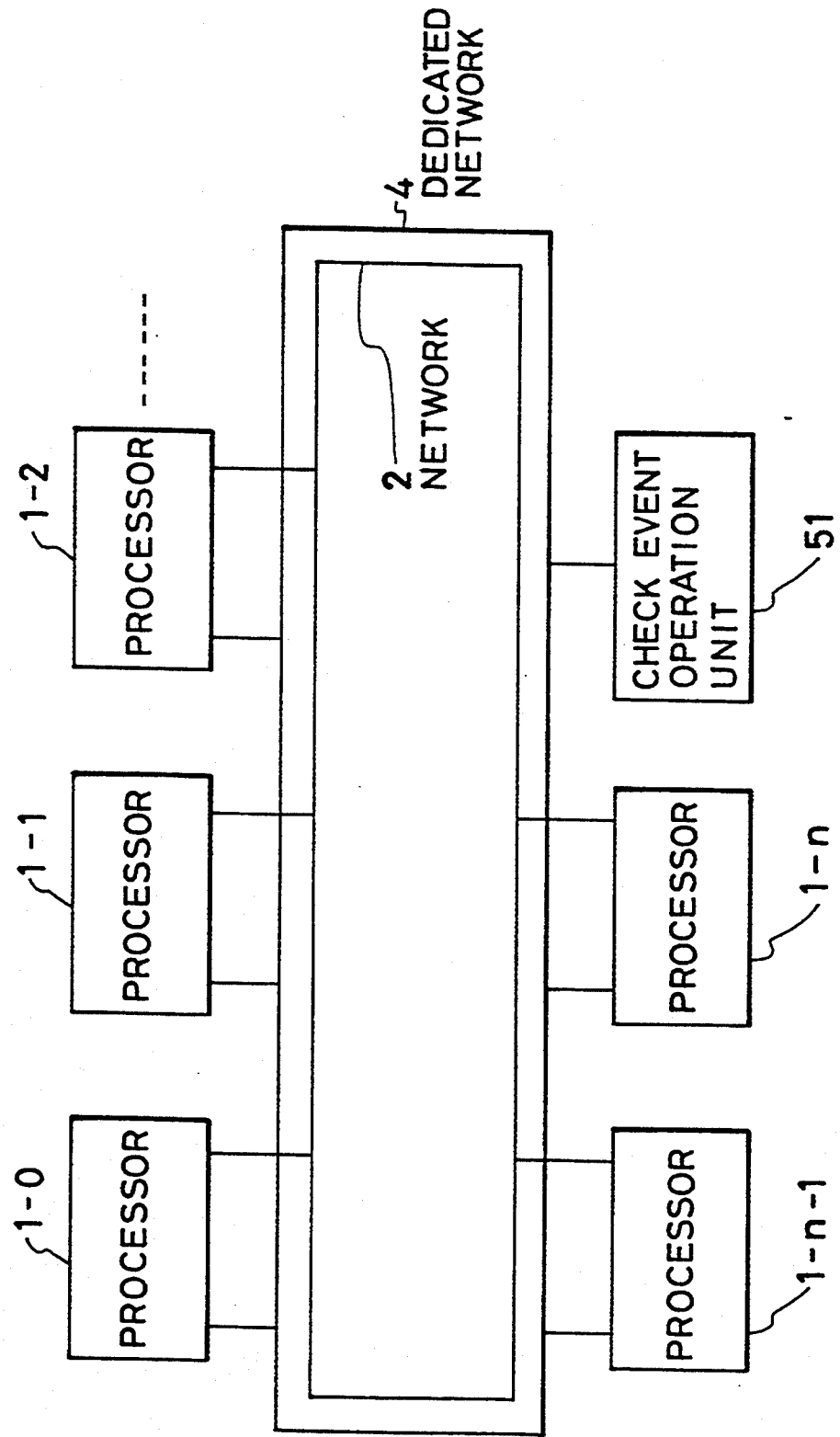

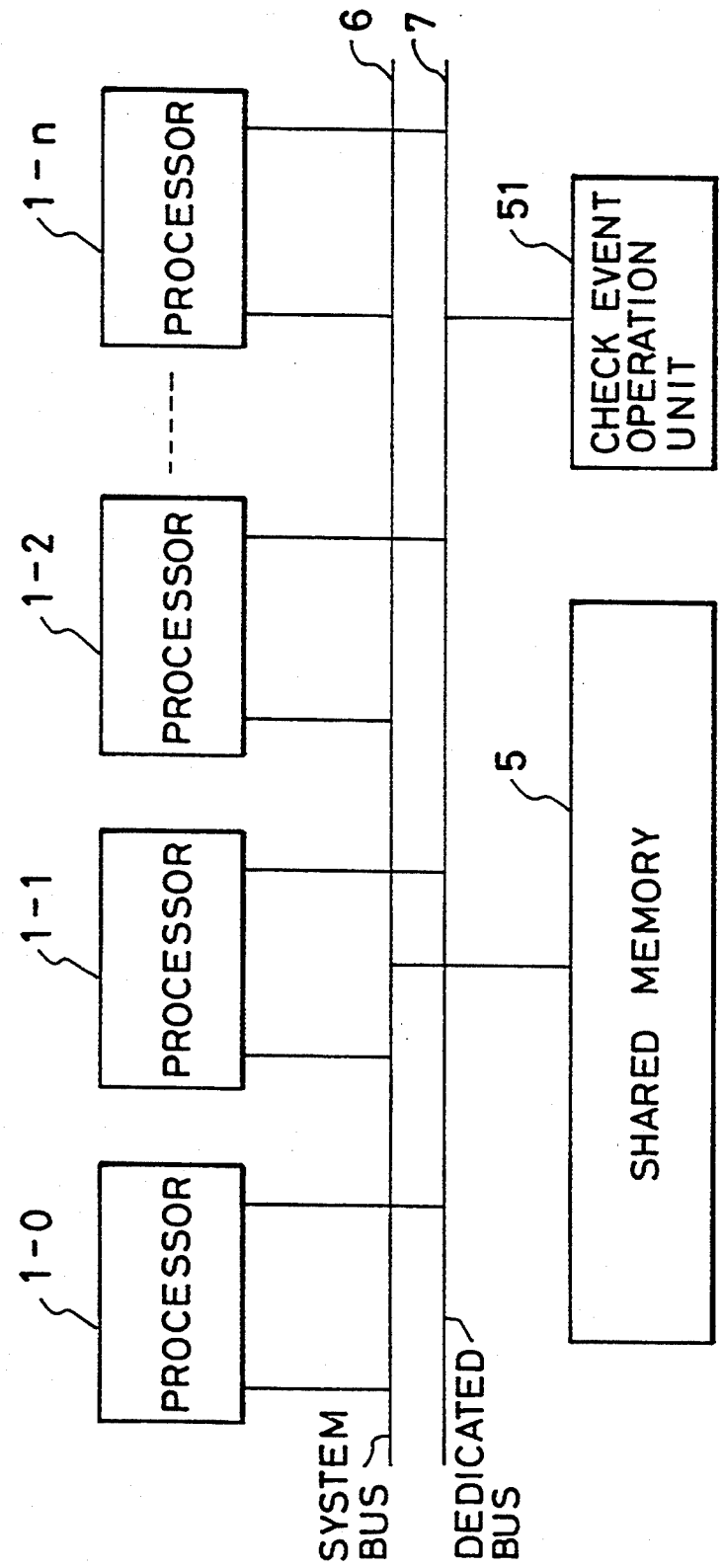

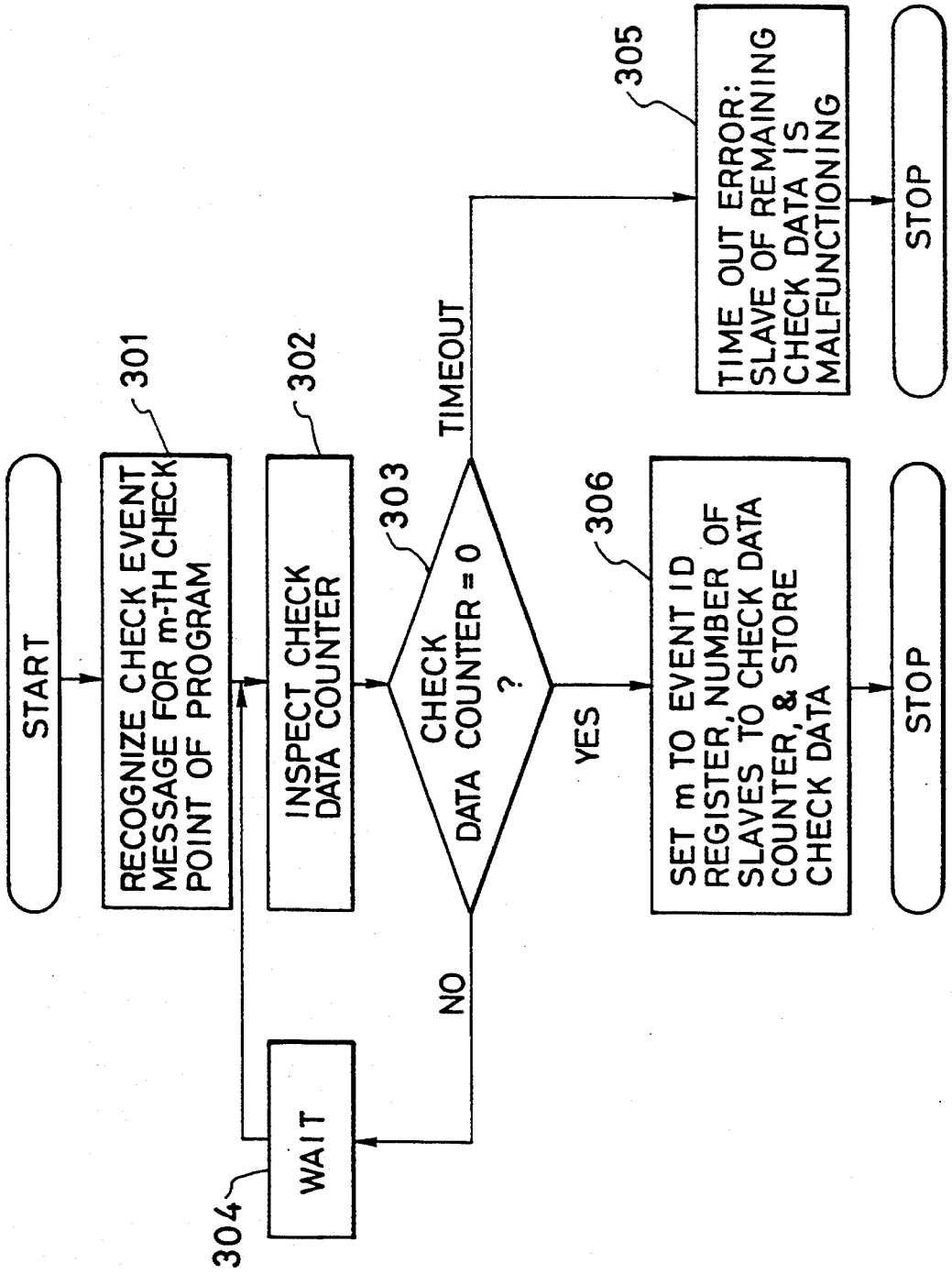

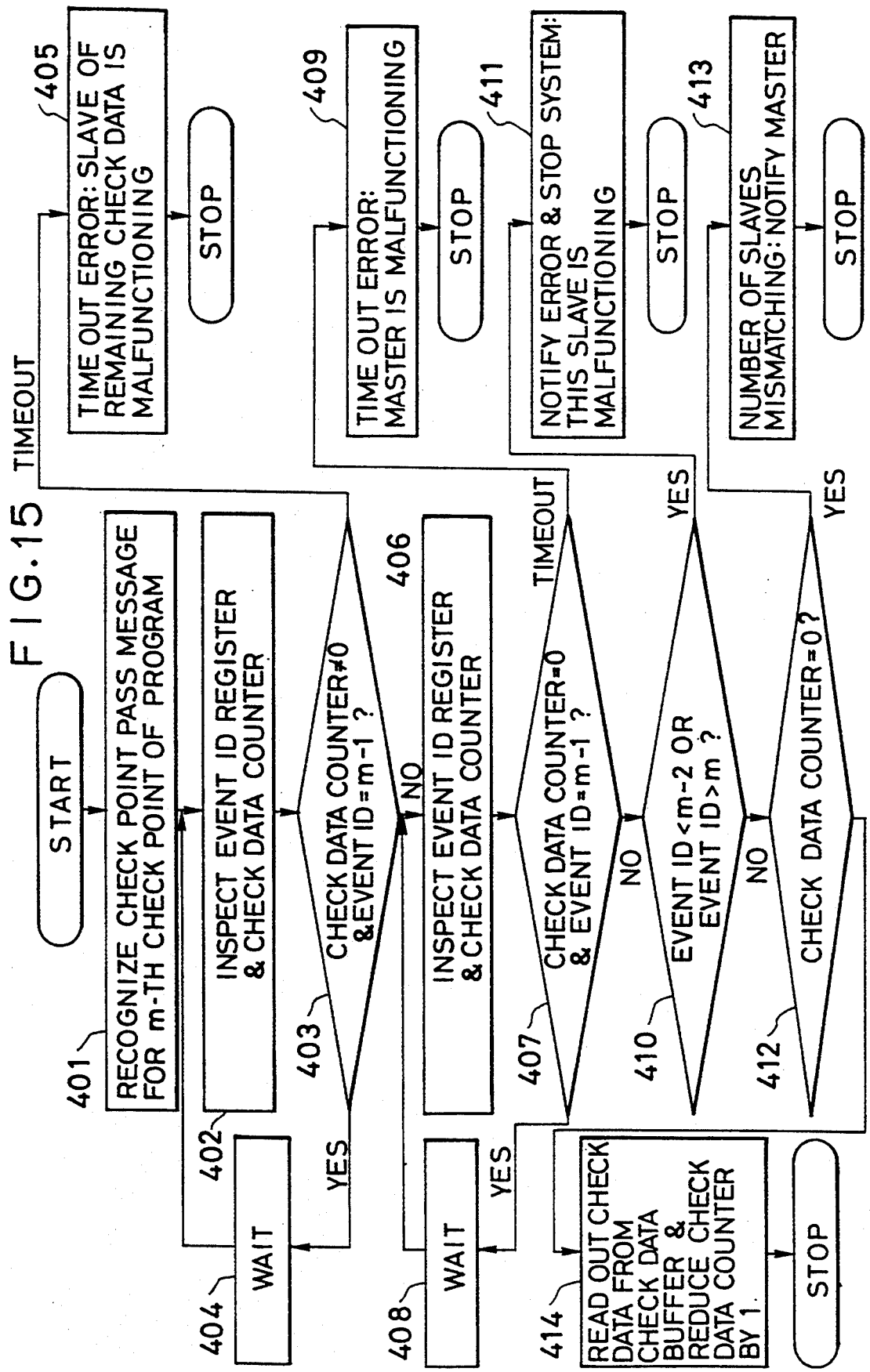

FIG.16

| SYSTEM STAGE | MASTER PROCESSOR SIDE | | |
|---|---|---|---|
| | SITUATION | | OPERATION |
| CHECK DATA COUNTER ≠ 0 | SLAVE NOT PASSING PREVIOS CHECK POINT EXISTS | | WAIT, OR NOTIFY ERROR: SLAVE OF REMAINING CHECK DATA IS MALFUNCTIONING |
| CHECK DATA COUNTER = 0 | NORMAL | | EXECUTE CHECK EVENT OPERATION |
| | SLAVE PROCESSOR SIDE (SEQUENTIALLY FROM TOP TO BOTTOM) | | |
| SYSTEM STATE | SITUATION | | OPERATION |
| EVENT ID = m-1 & CHECK DATA COUNTER ≠ 0 | SLAVE NOT PASSING PREVIOUS CHECK POINT EXISTS | | WAIT, OR NOTIFY ERROR: SLAVE OF REMAINING CHECK DATA IS MALFUNCTIONING |
| EVENT ID = m-1 & CHECK DATA COUNTER = 0 | MASTER NOT YET REACHING NEXT CHECK POINT | | STOP SYSTEM: MASTER IS MALFUNCTIONING |
| EVENT ID<m-2 OR EVENT ID>m | INCORRECT CHECK POINT PASS MESSAGE | | NOTIFY ERROR OR STOP SYSTEM: SLAVE ORIGINATING THIS MESSAGE IS MALFUNCTIONING |
| CHECK DATA COUNTER≠0 | NORMAL | | EXECUTE CHECK POINT PASS OPERATION |
| CHECK DATA COUNTER≠0 | NUMBER OF SLAVES MISMATCHING | | NOTIFY MASTER, CONTINUE OPERATION, OR STOP SYSTEM |

MASTER-SLAVE TYPE MULTI-PROCESSING SYSTEM WITH MULTICAST AND FAULT DETECTION OPERATIONS HAVING IMPROVED RELIABILITY

BACKGROUND OF THE INVENTION

1. Field of the Invention

The present invention generally relates to a multi-processor data processing system in which a plurality of processors operates cooperatively, and more particularly to a fault detection in a multicast system in which a master processor and a plurality of slave processors are mutually synchronized and an identical message must be transferred from a single master processor to a number of slave processors.

2. Description of the Background Art

There has been a number of propositions and examples for a computer system in which a plurality of processors operate cooperatively, as an answer to a demand for a higher processing speed and a larger processing capacity which has been increasing constantly along with the development of computer technology.

In such a multi-processor data processing system, an efficiency of data transfer among the processors is a critical factor for determining the overall system performance, because a plurality of network linked processors must operate while mutually exchanging necessary data. Also, for correctly executing a plurality of processes to be carried out in a plurality of processors, it is necessary to have a data transfer method in which a transfer error can be prevented. In particular, a multi-processor configuration called a master-slave mechanism in which the processes are executed by transferring messages from a single master processor to a number of slave processors, it is necessary to carry out a multicast operation in which the same data is transferred to a plurality of slave processors at high speed and with high reliability.

There has been a number of propositions for realizing such a multicast system depending on different characteristics of different systems, which can be classified roughly into the following two types.

(1) Sequential transfer method

In a loosely linked multi-processor system such as that shown in FIG. 1 to be described in detail below for example, in which a plurality of processors 1-0 to 1-n are linked through a network 2, a multicast operation is achieved in a form of one to one correspondence. Namely, in a multicast operation, the process of transferring data from a master processor 1-0 to one of slave processors 1-1 to 1-n and then receiving a reception completion message from that one of the slave processors 1-1 to 1-n at the master processor 1-0 is repeated for each one of the slave processors 1-1 to 1-n, as many times as the number of slave processors 1-1 to 1-n.

In this method, the process is quite tedious, and for n slave processors 1-1 to 1-n, one multicast operation requires 2n message transfers, so that the multicast operation can increase the traffic on the network 2 considerably and deteriorates an overall performance of the system significantly.

Moreover, in this method, when one of the slave processors fails to receive the data for some reason, the data transfers to the other slave processors ready to receive the data are also stopped at that point, so that the transfer efficiency is not very high.

(2) Shared memory method

In a densely linked multi-processor system such as that shown in FIG. 2 to be described in detail below for example, in which a plurality of processors 1-0 to 1-n are linked by sharing a shared memory 5, a multicast operation is achieved in such a manner that the master processor 1-0 writes the transfer data into the shared memory 5 and then each of the slave processors 1-1 to 1-n looks up the data in the shared memory 5.

In this method, the amount of messages to be transferred is smaller compared with the case of the sequential transfer method described above, but there has been a problem related to the reliability of the data transfer. Namely, it becomes impossible to guarantee the correct data transfer in such a case in which the data in the shared memory 5 are overwritten by new data before it is confirmed that the data have been received by all of the slave processors 1-1 to 1-n.

Moreover, even when there is a slave processor which does not look up the data in the shared memory 5 because of some malfunction, the master processor 1-0 cannot detect the existence of Such a malfunctioning slave processor, so that there has been a tendency for a fault recovery operation to be delayed.

Now, in addition, in a multicast system having a multi-processor configuration, because a plurality of processors must operate cooperatively, it is critically important for the stability of the system performance to detect the malfunction of the individual processor as soon as possible. In a case of the above described master-slave type multicast system, because the fault recovery procedure is different for a case of malfunction in the master processor 1-0 and a case of malfunction in the slave processors 1-1 to 1-n, it is particularly preferable to have a mechanism for identifying the malfunctioning processor in addition to a fast malfunction detection mechanism.

However, In a conventional multicast system, no practically effective method for such a malfunction detection in a multicast system having a multi-processor configuration has been available.

Moreover, in a conventional multicast system, even if it is possible to detect the malfunction within each individual processor itself, there has been a possibility for the fault operations due to the malfunction of that processor to affect the operations of the other processors.

In particular, in a case of the master-slave type multicast system described above, when the master processor 1-0 happens to malfunction, the operations of the slave processors 1-1 to 1-n which operate by receiving necessary data from the master processor 1-0 are likely to be affected by this malfunction of the master processor 1-0.

Thus, conventionally, it has been impossible to detect and identify the malfunction in the processor which is frequently communicating with the other processors in order to apply a necessary fault recovery procedure.

SUMMARY OF THE INVENTION

It is therefore an object of the present invention to provide a multi-processor system capable of realizing a multicast operation and a check event operation at high speed and with high reliability, in which it is possible to suppress the increase of the traffic in the network by reducing an amount of message to be transferred between the master processor and each of the slave processors, to carry out the data transfer regardless of the order of reception by the slave processors, and to check the state of the individual processors at the time of data transfer.

It is another object of the present invention to provide a multi-processor system capable of realizing a multicast operation and a check event operation at high speed and with high reliability, in which it is possible for the individual processors to monitor the states of the other processors mutually, and in which a malfunctioning processor can be clearly identified quickly regardless of whether the malfunction is occurring in the master processor or one of the slave processors.

According to one aspect of the present invention there is provided a multi-processor system, comprising: a master processor for executing a pro,ram; a plurality of slave processors which are executing the program cooperatively with the master processor; and multicast operation means for carrying out a multicast operation between the master processor and the slave processors, including: first memory means for storing multicast data to be transferred from the master processor to the slave processors; second memory means for storing control data provided in correspondence with the slave processors; third memory means for storing multicast identification data for identifying a multicast point in the program corresponding to the multicast data stored in the first memory means: and control means for controlling a transfer of the multicast data stored in the first memory means to the slave processors such that each of the slave processors obtains desired multicast data for desired multicast point according to the multicast identification data stored in the third memory means, and the number of slave processors which have already obtained the desired multicast data is monitored according to the control data stored in the second memory means.

According to another aspect of the present invention there is provided a multi-processor system, comprising: a master processor for executing a program; a plurality of slave processors which are executing the program cooperatively with the master processor; and check event operation means for carrying out a check event operation between the master processor and the slave processors, including: first memory means for storing check data provided in correspondence with the slave processors; second memory means for storing event identification data for identifying a check point in the program corresponding to the check data stored in the first memory means; and control means for controlling the check event operation such that each of the slave processors checks a present check point according to the event identification data stored in the second memory means, and the number of slave processors which have already checked the present check point is monitored according to the check data stored in the first memory means.

According to another aspect of the present invention there is provided a method of multicast operation in a multi-processor system formed by a master processor, a plurality of slave processors cooperatively operating with the master processor, and multicast control means for carrying out a multichange operation, comprising the steps of: transferring a multicast request message from the master processor to the multicast operation means; storing multicast data to be transferred from the master processor to the slave processors in a first memory means provided in the multicast operation means, in response to a reception of the multicast request message from the master processor; storing control data provided in correspondence with the slave processors in a second memory means provided in the multicast operation means, in response to the reception of the multicast request message from the master processor; storing multicast identification data for identifying a multicast point in a program corresponding to the multicast data stored in the first memory means, in a third memory means provided in the multicast operation means, in response to the reception of the multicast request message from the master processors; transferring a data read out request message from each of the slave processor to the multicast operation means; and controlling a transfer of the multicast data stored in the first memory means to the slave processors such that each of the slave processors obtains desired multicast data for desired multicast point according to the multicast data, control data, and multicast identification data stored in the multicast operation means, in response to a reception of the data read out request message transferred from said each of the slave processors.

According to another aspect of the present invention there is provided a method of check event operation in a multi-processor system formed by a master processor, a plurality of slave processors cooperatively operating with the master processor, and check event operation means for carrying out a check event operation, comprising the steps of: transferring a check event message from the master processor to the check event operation means; storing check data provided in correspondence with the slave processors in a first memory means provided in the check-event operation means, in response to a reception of the check event message from the master processor; storing event identification data for identifying a check point in the program corresponding to the check data stored in the first memory means, in a second memory means provided in the check event operation means, in response to the reception of the check event message from the master processor; transferring a check point pass message from each of the slave processors to the check event operation means; and controlling the check event operation such that each of the slave processors checks a present check point according to the check data and event identification data stored in the check event operation means, in response to a reception of the check point pass message transferred from said each of the slave processors.

Other features and advantages of the present invention will become apparent from the following description taken in conjunction with the accompanying drawings.

BRIEF DESCRIPTION OF THE DRAWINGS

FIG. 2 is a schematic block diagram of a second embodiment of a multi-processor system according to the present invention.

FIG. 7 is a flow chart for a multicast operation in the multicast operation unit of FIG. 3 when the data read out request message of FIG. 5 is received.

FIG. 8 is a table summarizing the relationships between the various system states and the corresponding judgements and operations at the multicast operation unit of FIG. 3.

FIG. 9 is a schematic block diagram of a third embodiment of a multi-processor system according to the present invention.

FIG. 10 is a schematic block diagram of a fourth embodiment of a multi-processor system according to the present invention.

FIG. 14 is a flow chart for a multicast operation in the multicast operation unit of FIG. 11 when the multicast request message of FIG. 12 is received.

FIG. 15 is a flow chart for a multicast operation in the multicast operation unit of FIG. 11 when the data read out request message of FIG. 13 is received.

FIG. 16 is a table summarizing the relationships between the various system states and the corresponding judgements and operations at the multicast operation unit of FIG. 11;

DETAILED DESCRIPTION OF THE PREFERRED EMBODIMENTS

Figure 1:
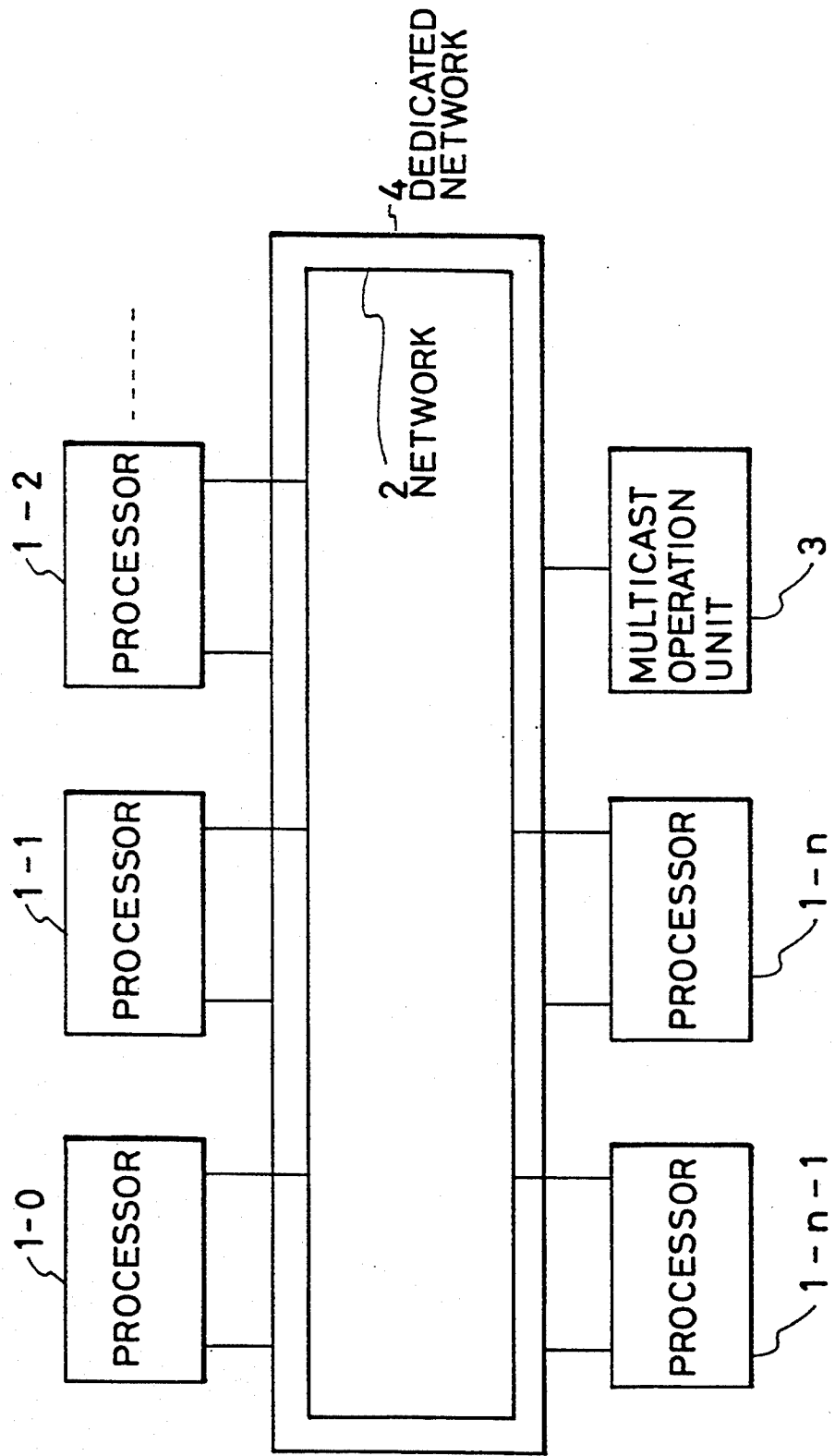
FIG. 1 is a schematic block diagram of a first embodiment of a multi-processor system according to the present invention.

Referring now to FIG. 1 and FIG. 2, first and second embodiments of a multi-processor system according to the present invention will be described in detail. In these first and second embodiments, the multi-processor system constitutes a master-slave type multicast system, where the first embodiment of FIG. 1 is the form of a loosely linked type while the second embodiment of FIG. 2 is in the form of a densely linked type.

The loosely linked multi-processor system of FIG. 1 comprises: a plurality of processors 1-0 to 1-n which are linked through a network 2; and a multicast operation unit 3 connected with each of the processors 1-0 to 1-n through a dedicated network 4, through which the multicast operation is to be carried out. In FIG. 1, the network 2 and the dedicated network 4 may take forms other than the loop shape shown in FIG. 1. Also, in FIG. 1, the dedicated network 4 is provided for the purpose of securing the high speed transfer for the multicast operation, although the multicast operation unit 3 can be connected with the processors 1-0 to 1-n-through the network 2.

The densely linked multi-processor system of FIG. 2 comprises: a plurality of processors 1-0 to 1-n which are linked by sharing a shared memory 5 through a system bus 6; and a multicast operation unit 3 connected with each of the processors 1-0 to 1-n through a dedicated bus 7, through which the multicast operation is to be carried out. In FIG. 2, the dedicated bus 7 is provided for the purpose of securing the high speed transfer for the multicast operation, although the multicast operation unit 3 can be connected with the processors 1-0 to 1-n through the system bus 6.

In either one of these first and second embodiments, the multicast operation is achieved by the transfer of request messages from the processors 1-0 to 1-n to the multicast operation unit 3, and the exchange of the multicast data at the multicast operation unit 3 according to the received request messages, as described in detail below.

Figure 3:
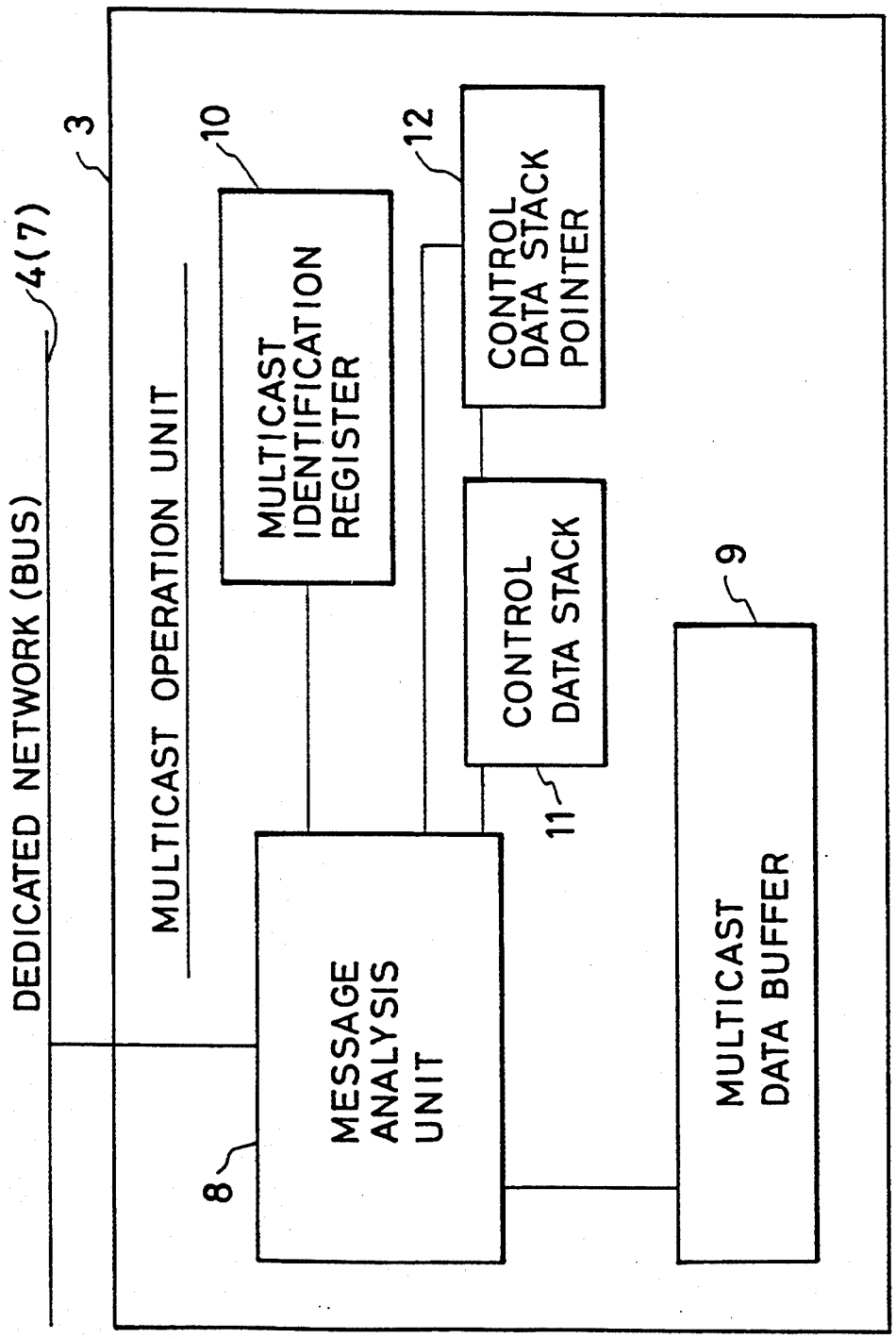
FIG. 3 is a detailed block diagram of a multicast operation unit in the multi-processor system of FIG. 1 or FIG. 2.

The multicast operation unit 3 has a detailed configuration shown in FIG. 3, which comprises: a message analysis unit 8 for receiving the request messages from the processors 1-0 to 1-n through the dedicated network 4 or the dedicated bus 7; a multicast data buffer 9 for temporarily storing the multicast data received through the message analysis unit 8; a multicast identification register 10 connected with the message analysis unit 8; a control data stack 11 connected with the message analysis unit 8; and a control data stack pointer 12 connected with the control data stack 11 and the message analysis unit 8.

The message analysis unit 8 receives and analyzes a multicast request message from a master processor 1-0 as well as a data read out request message from each of slave processors 1-1 to 1-n, so as to determine the subsequent operation appropriate for the type of request message received.

The multicast data buffer 9 is a buffer for temporarily storing the multicast data transferred from the master processor 1-0, from which the multicast data are read out and then transferred to each of the slave processors 1-1 to 1-n whenever the data read out request message received from each of the slave processors 1-1 to 1-n is judged appropriate as described in detail below. This multicast data buffer 9 has an appropriate buffer capacity predetermined according to the traffic capacity of the system and the transfer speeds of the network or bus.

The multicast identification register 10 is a register for storing a multicast identification for identifying the multicast data stored in the multicast data buffer 9, which is utilized in verifying the proper matching of the multicasting of the master processor 1-0 and the receiving of each of the slave processors 1-1 to 1-n. Usually, such a multicast identification is defined by selecting an appropriate initial value at a start of execution of each program and subsequently increasing a value by a prescribed increment for each multicast event, although any other definition may also be used so long as a uniquely determinable value is assigned to each of the consecutive multicast events.

The control data stack 11 is a stack for storing control data to be given to each of the slave processors 1-1 to 1-n for each multicast event, and the control data stack pointer 12 indicates the amount of data stored in the control data stack 11.

Figure 4:
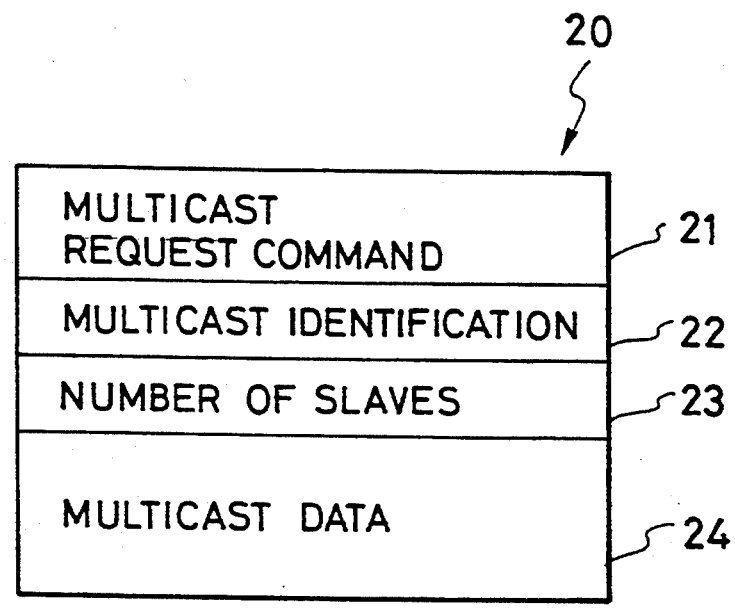
FIG. 4 is a diagram of a multicast request message to be transferred from a master processor in the first and second embodiments of the present invention.

The multicast request message to be transferred from the master processor 1-0 is in a format shown in FIG. 4, where the multicast request message 20 includes a multicast request command field 21, a multicast identification field 22, a number of slaves field 23, and a multicast data field 24.

Figure 5:
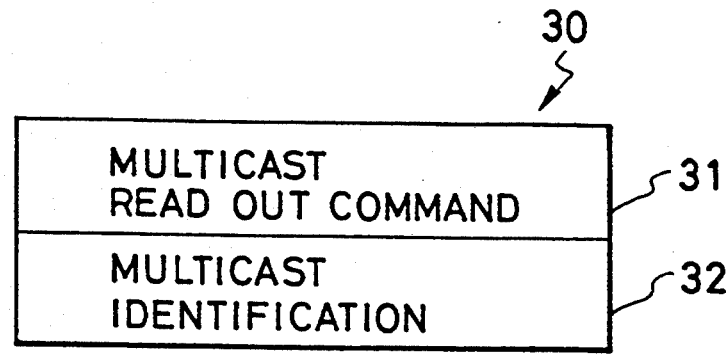
FIG. 5 is a diagram of a data read out request message to be transferred from each slave processor in the first and second embodiments of the present invention.

The data read out request message to be transferred from each of the slave processors 1-1 to 1-n is in a format shown in FIG. 5, where the data read out request message 30 includes a multicast read out command field 31, and a multicast identification field 32.

Now, the actual procedure for the multicast operation in this multi-processor system of FIG. 1 or FIG. 2 will be described in detail with reference to the flow charts of FIG. 6 and FIG. 7.

First, when the multicast request message 20 shown in FIG. 4 is transferred from the master processor 1-0 to the multicast operation unit 3, the multicast operation is carried out according to the flow chart of FIG. 6, as follows.

Namely, when the multicast request message 20 is received by the multicast operation unit 3, in step 101, the message analysis unit 8 recognizes that this is the multicast request message 20 from the master processor 1-0 according to a content of the multicast request command field 21 and that this multicast request is for an m-th multicast point of the program according to a value m in the multicast identification field 22.

Then, the message analysis unit 8 checks the value of the control data stack pointer 12 in step 102, and determines whether the control data stack 11 is empty or not in step 103.

In a case the control data stack 11 is not empty, this indicates the fact that the multicast data of the previous multicast point has not yet been received by all the slave processors 1-1 to 1-n as will be described in detail below, so that the message analysis unit 8 waits for a prescribed period of time in step 104 until the control data stack 11 becomes empty in step 103 within a prescribed time out period. In such a case, instead of waiting in step 104 the multicast operation unit 3 may inform the master processor 1-0 that the multicast data of the previous multicast point has not yet been received by all the slave processors 1-1 to 1-n.

If the control data stack 11 is not after the elapse of the prescribed time out period, then in step 108, the message analysis unit 8 judges it as a time out error in which the slave processor specified by the remaining entry of the control data stack 11 is regarded as malfunctioning.

In a case the control data stack 11 is or becomes empty at the step 103, in step 106, the message analysis unit 8 registers the value m of the multicast identification field 22 into the multicast identification register 10, and checks the number of slaves field 28 in order to enter as many control data as the number of slaves into the control data stack 11 so as necessary to update the value of the control data stack pointer 12.

Then in step 107, the message analysis unit 8 copies the data in the multicast data field 24 into the multicast data buffer 9, and returns a multicast completion message to the master processor 1-0.

Next, when the data read out request message 30 shown in FIG. 5 is transferred from each of the slave processors 1-1 to 1-n to the multicast operation unit 3, the multicast operation is carried out according to the flow chart of FIG. 7, as follows.

Namely, when the data read out request message 30 is received by the multicast operation unit 3, in step 201 the message analysis unit 8 recognizes that this is the data read out request message 30 from one of the slave processors 1-1 to 1-n according to a content of the multicast read out command field 31 and that this data read out request is for an m-th multicast point of the program according to a value m in the multicast identification field Then in step 202, the message analysis unit 8 compares the value m of the multicast identification field 32 with the multicast identification registered in the multicast identification register 10, while also checking a value of the control data stack pointer 12, and determines whether the multicast identification registered in the multicast identification register 10 is smaller than the multicast identification of the data read out request message 30 by one and the control data stack 11 is determined to be empty or not in step 203.

If the multicast identification registered in the multicast identification register 10 is found to be smaller than the multicast identification of the data read out request message 30 by one while the control data stack 11 is found to be not empty in step 203 the read out of the previous multicast data has not yet been completed for some slave processors, so that the message analysis unit 8 waits for a prescribed period of time in step 204 until the matching of the multicast identification is established in step 203 within a prescribed time out period. In such a case, instead of waiting in step 204 the multicast operation unit 3 may inform that slave processor about the that the data read out request message is premature and in error.

If the state of the multicast identification and the control data stack 11 .remains the same after the elapse of the prescribed time out period, then in step 205 the message analysis unit 8 judges it as a time out error in which the slave processor specified by the remaining entry of the control data stack 11 is regarded as being malfunctioning.

If it has failed to find that the multicast identification registered in the multicast identification register 10 is smaller than the multicast identification of the data read out request message 30 by one and the control data stack 11 is not empty in step 203, then in step 206, the message analysis unit 8 again compares the value m of the multicast identification field 32 with the multicast identification registered in the multicast identification register 10, while also checking a value of the control data stack pointer 12, and determines whether the multicast identification registered in the multicast identification register 10 is smaller than the multicast identification of the data read out request message 30 by one and whether the control data stack 11 is empty or not in step 207.

If the multicast identification registered in the multicast identification register 10 is found to be smaller than the multicast identification of the data read out request message 30 by one while the control data stack 11 is found to be empty in step 207, this indicates that the multicast data of that multicast point indicated by that multicast identification of the data read out request message 30 has not yet requested from the master processor 1-0, so that the message analysis unit 8 waits for a prescribed period of time in step 208 until the matching of the multicast identification is established in step 207 within a prescribed time out period. In such a case, the multicast operation unit 3 may also inform that slave processor that the data read out request message is premature and in error.

If the state of the multicast identification and the control data stack 11 remains the same after the elapse of the prescribed time out period, then in step 209, the message analysis unit 8 judges it as a time out error in which the master processor 1-0 is regarded as being malfunctioning.

If it has failed to find that the multicast identification registered in the multicast identification register 10 is smaller than the multicast identification of the data read out request message 30 by one and the control data stack 11 is empty in step 207, then in step 210, the message analysis unit 8 again compares the value m of the multicast identification field 32 with the multicast identification registered in the multicast identification register 10, and determines whether the multicast identification registered in the multicast identification register 10 is smaller than the multicast identification of the data read out request message 30 by a value different from one or greater than the multicast identification of the data read out request message 30.

If the multicast identification registered in the multicast identification register 10 is found to be smaller than the multicast identification of the data read out request message 30 by a value different from one or greater than the multicast identification of the data read out request message 30 in step 210, this indicates that the slave processor which transferred this multicast read out command 31 itself is in error, in which case an appropriate error correction operation must be carried out, so that this error is notified and the system is stopped.

If it has failed to find that the multicast identification registered in the multicast identification register 10 is smaller than the multicast identification of the data read out request message 30 by a value different from one in step 210, then step 212, the message analysis unit 8 checks a value of the control data stack pointer 12, and determines whether the control data stack 11 is empty or not.

If the control data stack 11 is found to be empty in step 212, this indicates that a number of the data read out request messages received is greater than the number of slave processors specified by the multicast request message 20 from the master processor 1-0. In such a case, depending on the level of the reliability required for the system and the importance of the content currently under the processing in the system, one of the following three options may be taken.

(1) It is regarded as a fatal error, so that the system as a whole is stopped.

(2) This data read out request message 30 from this slave processor is rejected and the subsequent operation is continued.

(3) The multicast data are given to this slave processor, while the master processor is notified of the occurrence of mismatching of the number of slaves so as to update the number of slave processors recognized by the master processor in the subsequent operation.

If it has failed to determine that the control data stack 11 is empty in step 212, then in step 214, the message analysis unit 8 removes one of the control data from the control data stack 11, and then reads out the multicast data stored in the multicast data buffer 9 and transfers the multicast data to the slave processor from which the data read out request message 30 originated.

Figure 6:
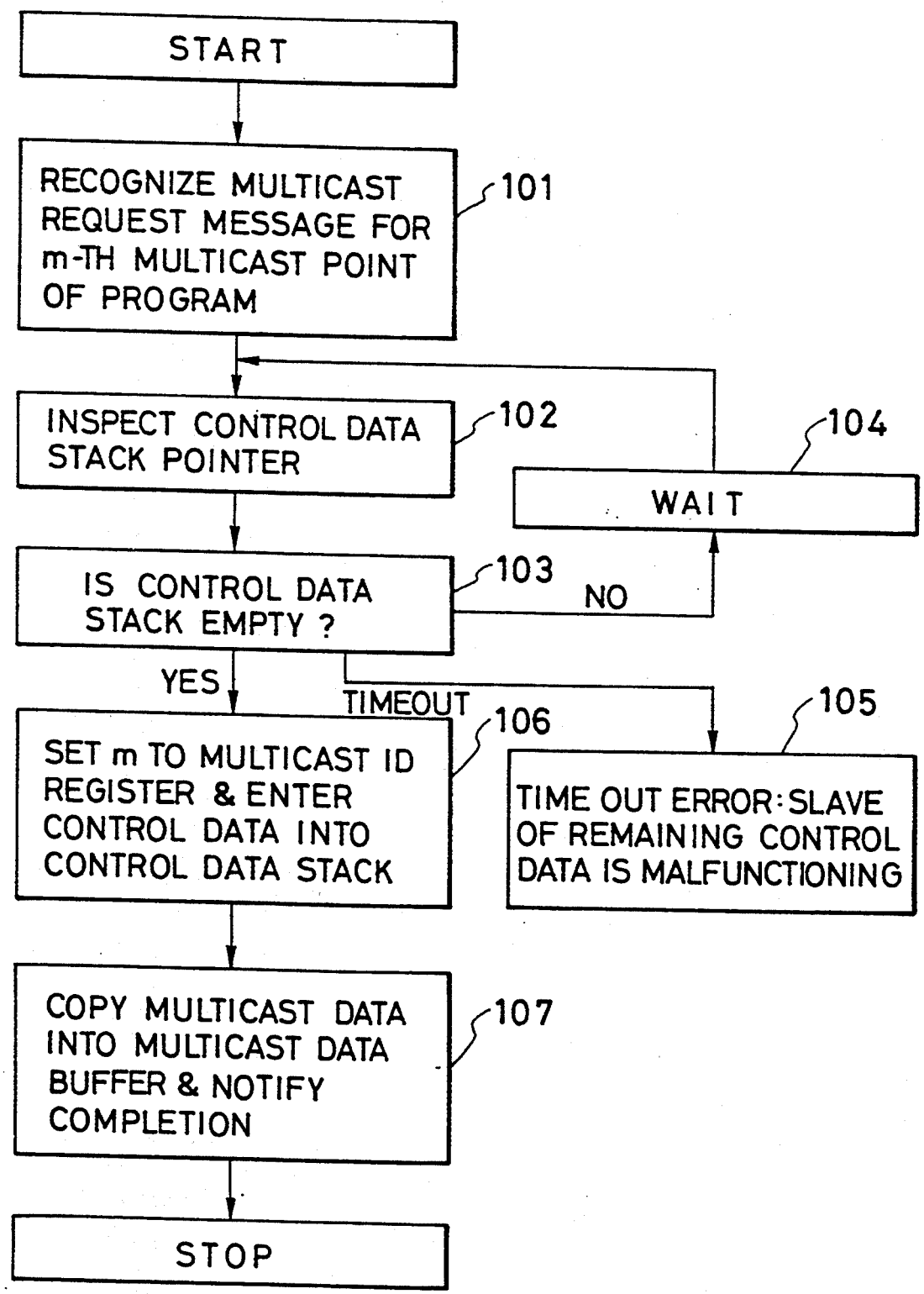
FIG. 6 is a flow chart for a multicast operation in the multicast operation unit of FIG. 3 when the multicast request message of FIG. 4 is received.

The relationships between the various system states and the corresponding judgements and operations at the multicast operation unit 3 described in detail above with references to FIG. 6 and FIG. 7 can be summarized as a table shown in FIG. 8.

It is to be noted that in the embodiments described above, the slave processors 1-1 to 1-n are not distinguished individually, and only a number of slave processors which received the multicast data are monitored, but the system may be modified to distinguish the individual slave processors as follows.

Namely, instead of using the identical control data for all the slave processors, each of the slave processors may be provided with a distinct identification label, and the control data are stacked in correspondence with the identification labels of the individual slave processors stored in another memory which is controlled in conjunction with the control data stack by using a counter, such that when the multicast data are given to the slave processor the control data corresponding to the identification label of that slave processor can be removed from the control data stack.

In such a modified embodiment, there are advantages in that which slave processor has not yet received the multicast data can be determined, and in that the multicast data can be transferred only to the selected ones of the slave processors.

Referring now to FIG. 9 and FIG. 10, third and fourth embodiments of a multi-processor system according to the present invention will be described in detail. In these third and fourth embodiments, the multi-processor system constitutes a master-slave type event checking system for detecting the occurrence of faults, where the third embodiment of FIG. 9 is in a form of a loosely linked type while the fourth embodiment of FIG. 10 is in a form of a densely linked type.

The loosely linked multi-processor system of FIG. 9 comprises: a plurality of processors 1-0 to 1-n which are linked through a network 2; and a check event operation unit 51 connected with each of the processors 1-0 to 1-n through a dedicated network 4, through which the check event operation is to be carried out. In FIG. 9, the network 2 and the dedicated network 4 may take forms other than the loop shape shown in FIG. 9. Also, in FIG. 9, the dedicated network 4 is provided for the purpose of securing the high speed transfer for the check event operation, although the check event operation unit 51 can be connected with the processors 1-0 to 1-n through the network 2.

The densely linked multi-processor system of FIG. 10 comprises: a plurality of processors 1-0 to 1-n which are linked by sharing a shared memory 5 through a system bus 6; and a check event operation unit 51 connected with each of the processors 1-0 to 1-n through a dedicated bus 7, through which the check event operation is to be carried out. In FIG. 10, the dedicated bus 7 is provided for the purpose of securing the high speed transfer for the check event operation, although the check event operation unit 51 can be connected with the processors 1-0 to 1-n through the system bus 6.

Figure 11:
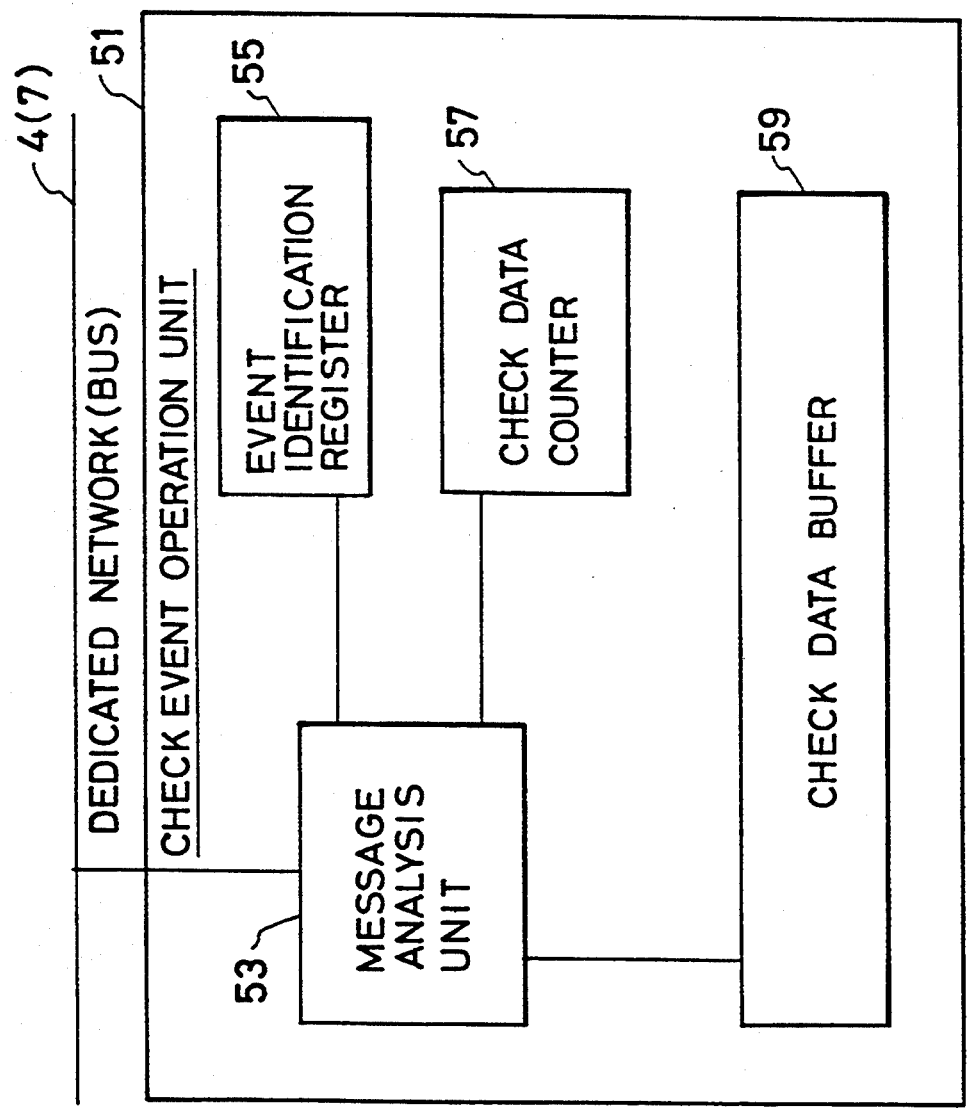
FIG. 11 is a detailed block diagram of a multicast operation unit in the multi-processor system of FIG. 9 or FIG. 10.

The check event operation unit 51 has a detailed configuration as shown in FIG. 11, which comprises: a message analysis unit 53 for receiving messages from the processors 1-0 to 1-n through the dedicated network 4 or the dedicated bus 7; an event identification register 55 connected with the message analysis unit 53; a check data counter connected with the message analysis unit 53; and a check data buffer 59 for temporarily storing the check data received through the message analysis unit 53.

The message analysis unit 53 receives and analyzes a check event message from a master processor 1-0 as well as a check point pass message from each of slave processors 1-1 to 1-n, so as to determine the subsequent operation appropriate for the type of message received.

The event identification register 55 is a register for storing an event identification for identifying the check point which is utilized in verifying the proper matching of the check point between the master processor 1-0 and each of the slave processors 1-1 to 1-n. Usually, such an event identification is defined by selecting an appropriate initial value at a start of execution of each program and subsequently increasing a value by a prescribed increment for each check point, although any other definition may also be used so long as a uniquely determinable value is assigned to each of the consecutive check points.

The check data buffer 59 is a buffer for temporarily storing the check data transferred from the master processor 1-0, from which the check data are read out and then transferred to each of the slave processors 1-1 to 1-n whenever the proper matching of the check point is established as described in detail below. This check data buffer 59 has an appropriate buffer capacity predetermined according to a number of slave processors 1-1 to 1-n. An amount of check data stored in this check data buffer 59 is indicated by the check data counter 57. Here, each of the check data is a value corresponding to a predetermined slave processor label of each of the slave processors 1-1 to 1-n.

Figure 12:
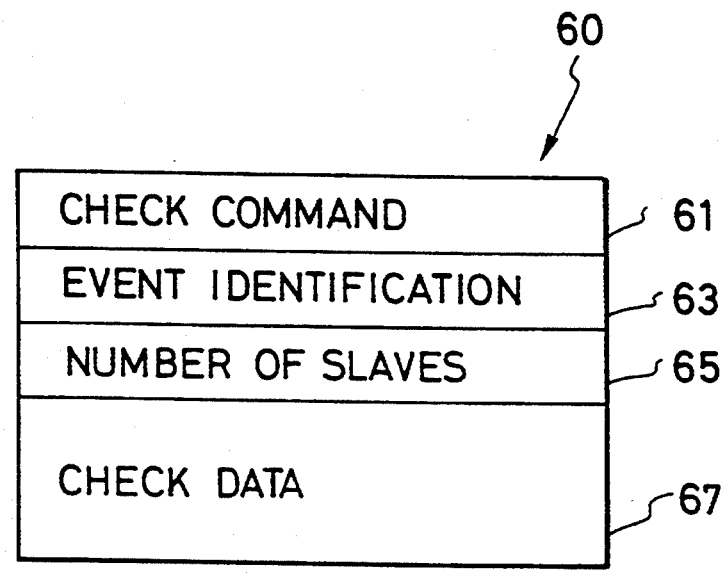
FIG. 12 is a diagram of a multicast request message to be transferred from a master processor in the third and fourth embodiments of the present invention.

The check event message to be transferred from the master processor 1-0 is in a format shown in FIG. 12, where the check event message 60 includes a check command field 61, an event identification field 63, a number of slaves field 65, and a check data field 67.

Figure 13:
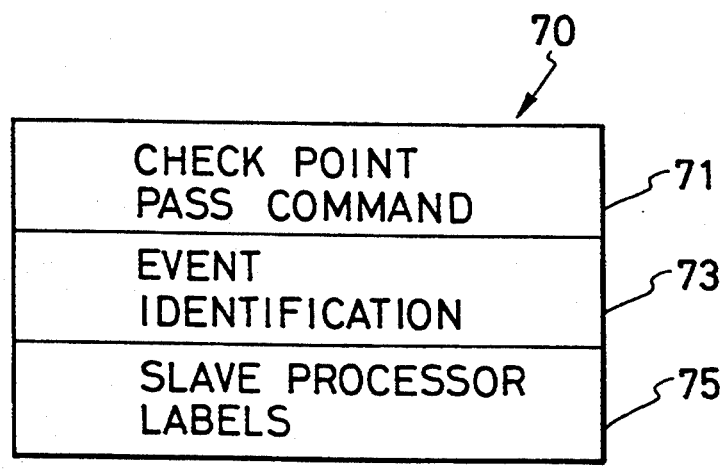
FIG. 13 is a diagram of a data read out request message to be transferred from each slave processor in the third and fourth embodiments of the present invention.

The check point pass message to be transferred from each of the slave processors 1-1 to 1-n is in a format shown in FIG. 13, where the check point pass message 70 includes a check point pass command field 71, an event identification field 73, and a slave processor label field 75.

Now, the actual procedure for the check event operation in this multi-processor system of FIG. 9 or FIG. 10 will be described in detail with reference to the flow charts of FIG. 14 and FIG. 15.

First, when the check event message 60 shown in FIG. 12 is transferred from the master processor 1-0 to the check event operation unit 51, the check event operation is carried out according to the flow chart of FIG. 14, as follows.

Namely, when the check event message 60 is received by the check event operation unit 51, in step 301, the message analysis unit 53 recognizes that this is the check event message 60 from the master processor 1-0 according to a content of the check command field 61 and that this check event message 60 is for an m-th check point of the program according to a value m in the event identification field 63.

Then, the message analysis unit 53 checks a value of the check data counter 57 in step 302, and determines whether the check data buffer 59 is empty or not in step 303.

If the check data buffer 59 is not empty, this indicates that the check point pass messages in response to the check event message at the previous check point have not yet been received from all the slave processors 1-1 to 1-n as will be described in detail below, so that the message analysis unit 53 waits for a prescribed period of time in step 304 until the check data buffer 59 becomes empty in step 303 within a prescribed time out period. In such a case, instead of waiting at the step 304 the check event operation unit 51 may inform the master processor 1-0 of the fact that the check point pass messages in response to the check event message at the previous check point have not yet been received from all the slave processors 1-1 to 1-n.

If the check data buffer 59 is not empty after the elapse of the prescribed time out period, then in step 305, the message analysis unit 53 judges it as a time out error in which the slave processor specified by the remaining entry of the check data is regarded as malfunctioning.

If the check data buffer 59 is or becomes empty in step 303, then in step 306, the message analysis unit 53 registers the value m of the event identification field 63 into the event identification register 55, enters a value of the number of slaves field 65 into the check data counter 57, copies the content of the check data field 67 into the check data buffer 59, and returns a check event completion message to the master processor 1-0.

Next, when the check point pass message 70 shown in FIG. 13 is transferred from each of the slave processors 1-1 to 1-n to the check event operation unit 51, the check event operation is carried out according to the flow chart of FIG. 15, as follows.

Namely, when the check point pass message 70 is received by the check event operation unit 51, in step 401, the message analysis unit 53 recognizes that this is the check point pass message 70 from one of the slave processors 1-1 to 1-n according to a content of the check point pass command field 71 and that this check point pass message 70 is for an m-th check point of the program according to a value m in the event identification field 73.

Then in step 402, the message analysis unit 53 compares the value m of the event identification field 73 with the event identification registered in the event identification register 55, while also checking a value of the check data counter 57, and determines whether the event identification registered in the event identification register 55 is smaller than the event identification of the check point pass message 70 by one and the check data counter 57 is not equal to zero, or not in step 403.

If the event identification registered in the event identification register 55 is found to be smaller than the event identification of the check point pass message 70 by one while the check data counter 57 is found to be not equal to zero in step 403, this indicates that the check point pass messages for the previous check point have not yet been received from some slave processors, so that the message analysis unit 53 waits for a prescribed period of time in step 404 until the matching of the check point is established in step 403 within a prescribed time out period. In such a case, instead of waiting in step 404 the check event operation unit 51 may inform that slave processor of the fact that the check point pass message is premature and in error.

If the state of the event identification and the check data counter 57 remains the same after the elapse of the prescribed time out period, then in step 405, the message analysis unit 53 judges it as a time out error in which the slave processor specified by the remaining entry of the check data is regarded as malfunctioning.

If it has failed to determine that the event identification registered in the event identification register 55 is smaller than the event identification of the check point pass message 70 by one and the check data counter 57 is not equal to zero at the step 403, next at the step 406, the message analysis unit 53 again compares the value m of the event identification field 73 with the event identification registered in the event identification register 55, while also checking a value of the check data counter 57, and determines whether the event identification registered in the event identification register 55 is smaller than the event identification of the check point pass message 70 by one and the check data counter 57 is equal to zero, or not at the step 407.

If the event identification registered in the event identification register 55 is found to be smaller than the event identification of the check point pass message 70 by one while the check data counter 57 is found to be equal to zero at the step 407, this indicates that the check event message 60 for that check point indicated by that event identification of the check point pass message 70 has not yet received from the master processor 1-0, so that the message analysis unit 53 waits for a prescribed period of time at the step 408 until the matching of the check point is established at the step 407 within a prescribed time out period. In such a case, instead of waiting at the step 408 the check event operation unit 51 may inform that slave processor about the fact that the check point pass message is premature and in error.

If the state of the event identification and the check data counter 57 remains the same after the elapse of the prescribed time out period, then at the step 409, the message analysis unit 53 judges it as a time out error in which the master processor 1-0 is regarded as being malfunctioning.

In a case it has failed to find that the event identification registered in the event identification register 55 is smaller than the event identification of the check point pass message 70 by one and the cheek data counter is equal to zero at the step 407, next at the step 410, the message analysis unit 53 again compares the value m of the event identification field 73 with the event identification registered in the event identification register 55, and determines whether the event identification registered in the event identification register 55 is smaller than the event identification of the check point pass message 70 by a value different from one or greater than the event identification of the check point pass message 70.

If the event identification registered in the event identification register 55 is found to be smaller than the event identification of the check point pass message 70 by a value different from one or greater than the event identification of the check point pass message 70 at the step 410, this indicates the fact that the slave processor which transferred this check point pass message 70 itself is in error, in which case an appropriate error correction operation must be carried out, so that this error is notified and the system is stopped.

In a case it has failed to find that the event identification registered in the event identification register 55 is smaller than the event identification of the check point pass message 70 by a value different from one at the step 410, next at the step 412, the message analysis unit 53 checks a value of the check data counter 57, and determines whether the check data counter 57 is equal to zero or not.

If the check data counter 57 is found to be equal to zero at the step 412, this indicates that a number of the check point pass messages received is greater than the number of slave processors specified by the check event message 60 from the master processor 1-0. In such a case, depending on the level of the reliability required for the system and the importance of the content current under the processing in the system, one of the following three options may be taken.

(1) It is regarded as a fatal error, so that the system as a whole is stopped.
(2) This check point pass message 70 from this slave processor is rejected and the subsequent operation is continued.
(3) The check data are given to this slave processor, while the master processor is notified of the occurrence of mismatching of the number of slaves so as to update the number of slave processors recognized by the master processor in the subsequent operation.

In a case it has failed to find that the check data counter 57 is equal to zero at the step 412, next at the step 414, the message analysis unit 53 removes one of the check data from the check data buffer 59, and then read out the check data stored in the check-data buffer 59 and transfer the check data to the slave processor from which the check point pass message 70 originated.

The relationships between the various system states and the corresponding judgements and operations at the check event operation unit 51 described in detail above with references to FIG. 14 and FIG. 15 can be summarized as a table shown in FIG. 16.

Figure 17:
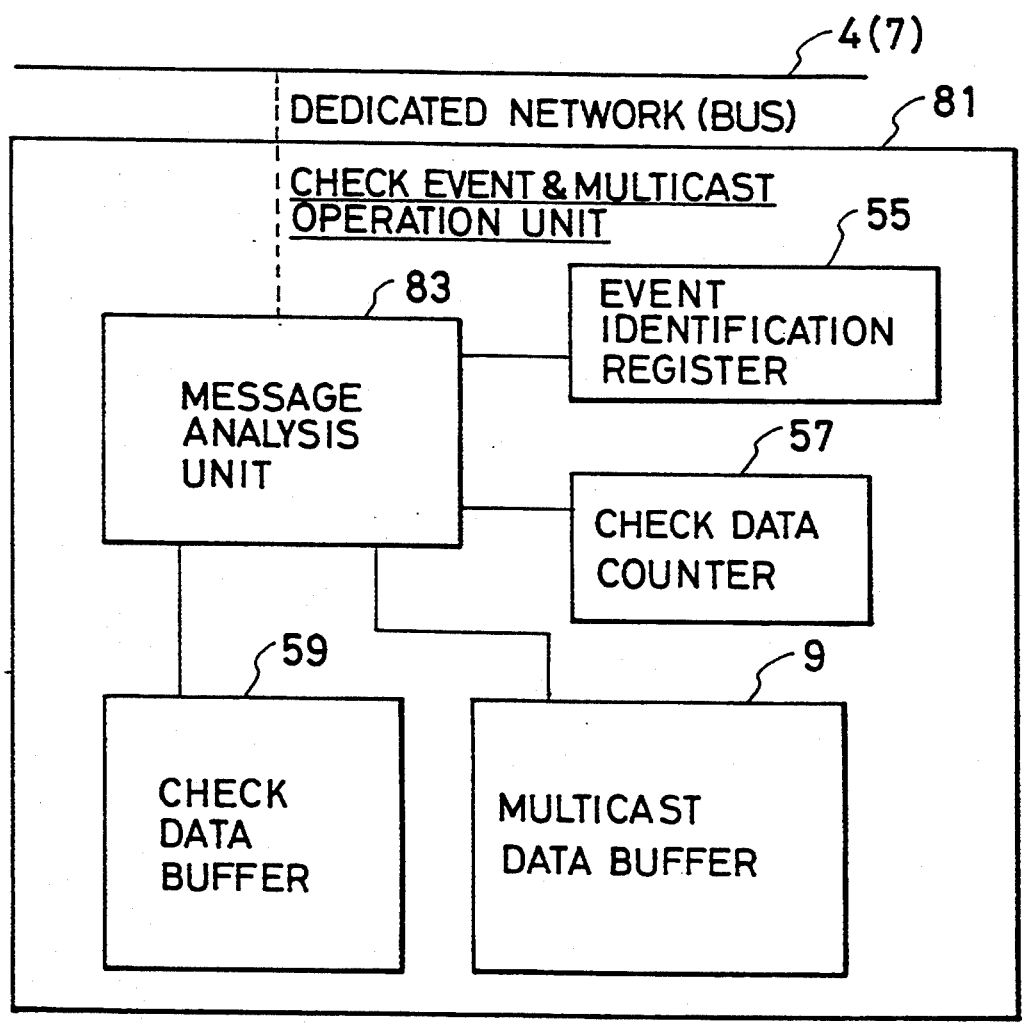
FIG. 17 is a detailed block diagram of a multicast operation unit in a fifth embodiment of the multi-processor system according to the present invention.

Referring now to FIG. 17, a fifth embodiment of a multi-processor system according to the present invention will be described in detail. In this multi-processor system of the fifth embodiment, the master-slave type multicast system of the first or second embodiment described above is combined with the master-slave type event checking system of the third or fourth embodiment described above. This multi-processor system of the fifth embodiment may be in a form of a loosely linked type such as those shown in FIG. 1 and FIG. 9, or in a form of a densely linked type such as those shown in FIG. 2 and FIG. 10.

In this fifth embodiment, the check event and multicast operation unit 81 has a detailed configuration as shown in FIG. 17, which comprises: a message analysis unit 83 for receiving messages from the processors 1-0 to 1-n through the dedicated network 4 or the dedicated bus 7; an event identification register 55 connected with the message analysis unit 83; a check data counter 57 connected with the message analysis unit 83; a check data buffer 59 for temporarily storing the check data received through the message analysis unit 83; and a multicast data buffer 9 for temporarily storing the multicast data received through the message analysis unit 83.

The message analysis unit 83 receives and analyzes a check event message from a master processor 1-0 as well as a check point pass message from each of slave processors 1-1 to 1-n, so as to determine the subsequent operation appropriate for the type of message received.

The event identification register 55 is a register for storing an event identification for identifying the check point which is utilized in verifying the proper matching of the check point between the master processor 1-0 and each of the slave processors 1-1 to 1-n. Usually, such an event identification is defined by selecting an appropriate initial value at a start of execution of each program and subsequently increasing a value by a prescribed increment for each check point, although any other definition may also be used so long as a uniquely determinable value is assigned to each of the consecutive check points.

Figure 18:
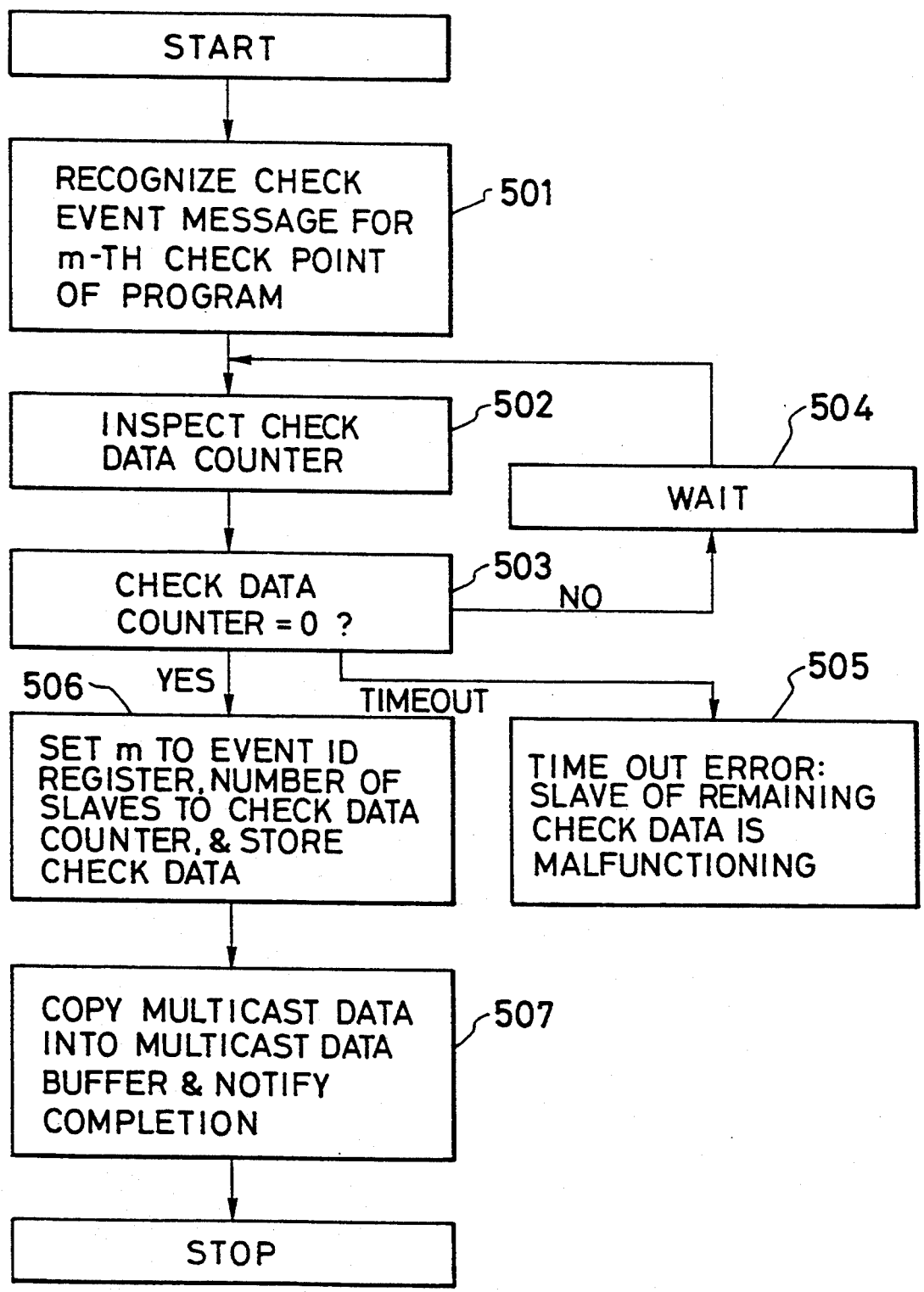
FIG. 18 is a flow chart for a multicast operation in the multicast operation unit of FIG. 17 when the multicast request message is received.

The check data buffer 59 is a buffer for temporarily storing the check data transferred from the master multicast operation unit 81, the check event and multicast operation is carried out according to the flow chart of FIG. 18, as follows.

Namely, when the check event message is received by the check event and multicast operation unit 81, at the step 501, the message analysis unit 83 recognizes that this is the check event message from the master processor 1-0 according to a content of the check command field and that this check event message is for an m-th check point of the program according to a value m in the event identification field.

Then, the message analysis unit 83 checks a value of the check data counter 57 at the step 502, and determines whether the check data buffer 59 is empty or not at the step 503.

In a case the check data buffer 59 is not empty, this indicates the fact that the check point pass messages in response to the check event message at the previous check point have not yet been received from all the slave processors 1-1 to 1-n as will be described in detail below, so that the message analysis unit 83 waits for a prescribed period of time at the step 504 until the check data buffer 59 becomes empty at the step 503 within a prescribed time out period. In such a case, instead of waiting at the step 504 the check event operation and multicast unit 81 may inform the master processor 1-0 about the fact that the check point pass messages in response to the check event message at the previous check point have not yet been received from all the slave processors 1-1 to 1-n.

If the check data buffer 59 remains to be non-empty after the elapse of the prescribed time out period, then at the step 505, the message analysis unit 83 judges it as a time out error in which the slave processor specified by the remaining entry of the check data is regarded as being malfunctioning. processor 1-0, from which the check data are read out and then transferred to each of the slave processors 1-1 to 1-n whenever the proper matching of the check point is established as described in detail below. This check data buffer 59 has an appropriate buffer capacity predetermined according to a number of slave processors 1-1 to 1-n. An amount of check data stored in this check data buffer 59 is indicated by the check data counter 57. Here, each of the check data is a value corresponding to a predetermined slave processor label of each of the slave processors 1-1 to 1-n.

The multicast data buffer 9 is a buffer for temporarily storing the multicast data transferred from the master processor 1-0 along with the check event message, from which the multicast data are read out and then transferred to each of the slave processors 1-1 to 1-n whenever the proper matching of the check point is established as described in detail below. This multicast data buffer 9 has an appropriate buffer capacity predetermined according to the traffic capacity of the system and the transfer speeds of the network or bus.

The check event message to be transferred from the master processor 1-0 is substantially similar to that shown in FIG. 12 with an exception that it is also accompanied with the multicast data to be given to the slave processors 1-1 to 1-n, whereas the check point pass message to be transferred from each of the slave processors 1-1 to 1-n is substantially similar to that shown in FIG. 13.

Figure 19:
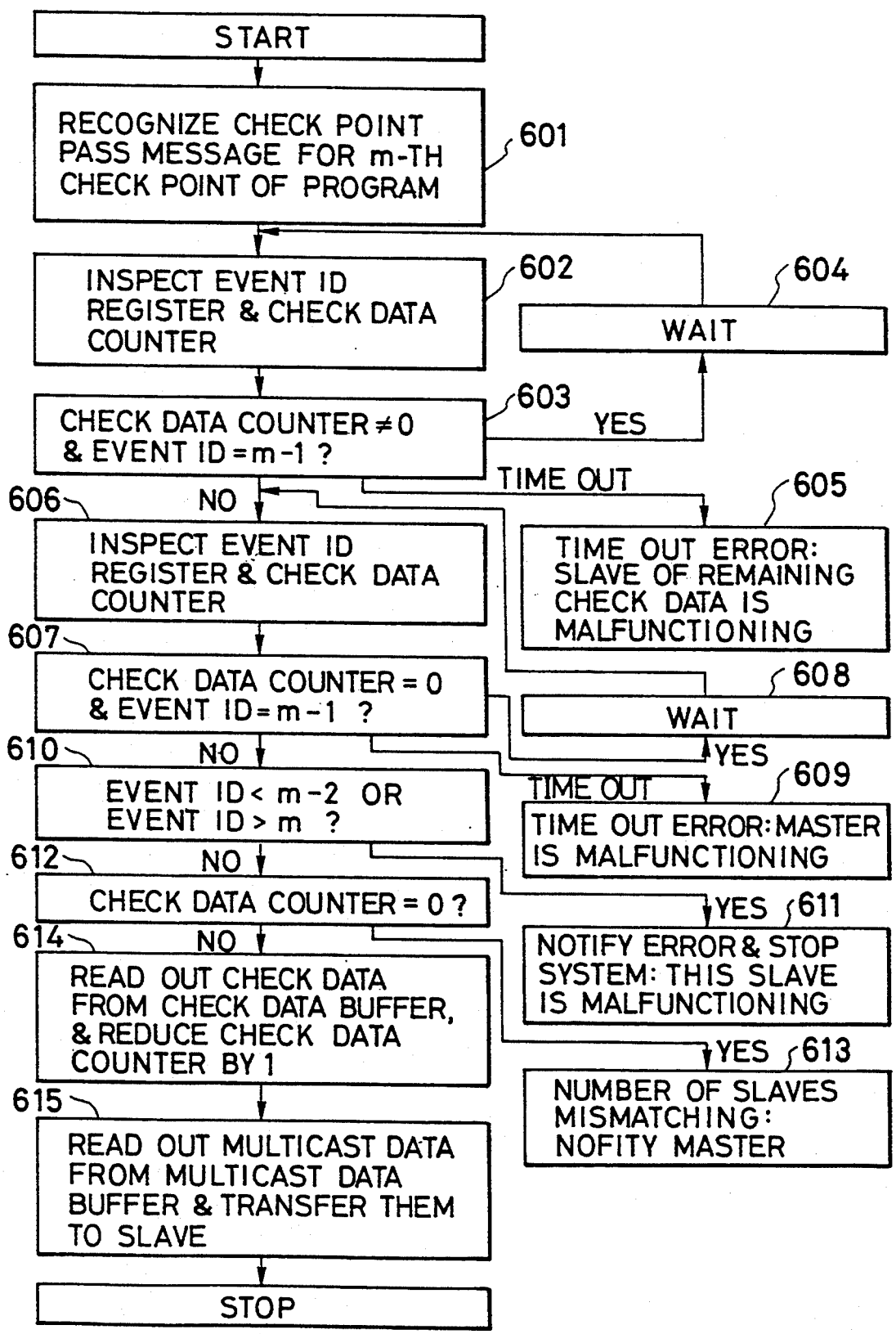
FIG. 19 is a flow chart for a multicast operation in the multicast operation unit of FIG. 17 when the data read out request message is received.

Now, the actual procedure for the check event and multicast operation in this multi-processor system of the fifth embodiment will be described in detail with reference to the flow charts of FIG. 18 and FIG. 19.

First, when the check event message is transferred from the master processor 1-0 to the check event and In a case the check data buffer 59 is or becomes empty at the step 503, next at the step 506, the message analysis unit 83 registers the value m of the event identification field into the event identification register 55, enters a value of the number of slaves field into the check data counter 57, and writes the content of the check data field into the check data buffer 59.

Then at the step 507, the message analysis unit 83 copies the data in the multicast data field into the multicast data buffer 9, and returns a multicast completion message to the master processor 1-0.

Next, when the check point pass message is transferred from each of the slave processors 1-1 to 1-n to the check event and multicast operation unit 81, the check event and multicast operation is carried out according to the flow chart of FIG. 19, as follows.

Namely, when the check point pass message is received by the check event and multicast operation unit 81, at the step 601, the message analysis unit 83 recognizes that this is the check point pass message from one of the slave processors 1-1 to 1-n according to a content of the check point pass command field and that this check point pass message is for an m-th check point of the program according to a value m in the event identification field.

Then at the step 602, the message analysis unit 83 compares the value m of the event identification field with the event identification registered in the event identification register 55, while also checking a value of the check data counter 57, and determines whether the event identification registered In the event identification register 55 is smaller than the event identification of the check point pass message by one and the check data counter 57 is not equal to zero, or not at the step 603.

If the event identification registered in the event identification register 55 is found to be smaller than the event identification of the check point pass message by one while the check data counter 57 is found to be not equal to zero at the next step 603, this indicates the fact that the check point pass messages for the previous check point have not yet received from some slave processors, so that the message analysis unit 83 waits for a prescribed period of time at the step 604 until the matching of the check point is established at the step 603 within a prescribed time out period. In such a case, instead of waiting at the step 604 the check event and multicast operation unit 81 may inform that slave processor about the fact that the check point pass message is premature and in error.

If the state of the event identification and the check data counter 57 remains the same after the elapse of the prescribed time out period, then at the step 605, the message analysis unit 83 judges it as a time out error-in which the slave processor specified by the remaining entry of the check data is regarded as being malfunctioning.

In a case it has failed to find that the event identification registered in the event identification register 55 is smaller than the event identification of the check point pass message by one and the check data counter 57 is not equal to zero at the step 603, next at the step 606, the message analysis unit 83 again compares the value m of the event identification field with the event identification registered in the event identification register 55, while also checking a value of the check data counter 57, and determines whether the event identification registered in the event identification register 55 is smaller than the event identification of the check point pass message by one and the check data counter 57 is equal to zero, or not at the step 607.

If the event identification registered in the event identification register 55 is found to be smaller than the event identification of the check point pass message by one while the check data counter 57 is found to be equal to zero at the step 607, this indicates the fact that the check event message for that check point indicated by that event identification of the check point pass message has not yet received from the master processor 1-0, so that the message analysis unit 83 waits for a prescribed period of time at the step 608 until the matching of the check point is established at the step 607 within a prescribed time out period. In such a case, instead of waiting at the step 608 the check event and multicast operation unit 81 may inform that slave processor about the fact that the check point pass message is premature and in error.

If the state of the event identification and the check data counter 57 remains the same after the elapse of the prescribed time out period, then at the step 609, the message analysis unit 83 judges it as a time out error which the master processor 1-0 is regarded as malfunctioning.

If it has failed to determine that the event identification registered in the event identification register 55 is smaller than the event identification of the check point pass message by one and the check data counter is equal to zero at the step 607, next at the step 610, the message analysis unit 83 again compares the value m of the event identification field with the event identification registered in the event identification register 55, and determines whether the event identification registered in the event identification register 55 is smaller than the event identification of the check point pass message by a value different from one or greater than the event identification of the check point pass message.

If the event identification registered in the event identification register 55 is found to be smaller than the event identification of the check point pass message by a value different from one or greater than the event identification of the check point pass message at the step 610, this indicates the fact that the slave processor which transferred this check point pass message itself is in error, in which case an appropriate error correction operation must be carried out, so that this error is notified and the system is stopped.

If it has failed to determined that the event identification registered in the event identification register 55 is smaller than the event identification of the check point pass message by a value different from one at the step 610, next at the step 612, the message analysis unit 83 checks a value of the check data counter 57, and determines whether the check data counter 57 is equal to zero or not.

If the check data counter 57 is found to be equal to zero at the step 612, this indicates the fact that a number of the check point pass messages received is greater than the number-of slave processors specified by the check event message from the master processor 1-0. In such a case, depending on the level of the reliability required for the system and the importance of the content current under the processing in the system, one of the following three options may be taken.

(1) It is regarded as a fatal error, so that the system as a whole is stopped.
(2) This check point pass message from this slave processor is rejected and the subsequent operation is continued.
(3) The check data are given to this slave processor, while the master processor is notified the occurrence of mismatching of the number of slaves so as to update the number of slave processors recognized by the master processor in the subsequent operation.

In a case it has failed to find that the check data counter 57 is equal to zero at the step 612, next at the step 614, the message analysis unit 83 removes one of the check data from the check data buffer 59, and then read out the check data stored in the check data buffer 59 and transfer the check data to the slave processor from which the check point pass message originated. Finally, at the step 615, the message analysis unit 83 read out the multicast data stored in the multicast data buffer 9 and transfer the multicast data to the slave processor from which the check point pass message originated.

As described in detail above, according to the present invention, the normality of the multicast operation is verified by checking whether the control data is empty or not, so that it becomes possible to provide a multicast system capable of realizing a multicast operation at high speed and with high reliability, in which it is possible to suppress the increase of the traffic in the network by reducing-an amount of message to be transferred between the master processor and each of the slave processors.

Moreover, according to the present invention, the state of the processors involved are mutually monitored at every multicast point, so that it becomes possible to provide a multi-processor system with high reliability in which it is possible to detect the malfunction of a processor involved at a time of each data transfer easily.

Furthermore, according to the present invention, it becomes possible in the master-slave type multi-processor system to detect the fault and to identify the malfunctioning processor quickly, because it is possible for the individual processors to monitor the states of the other processors mutually, and therefore it becomes possible to provide a multicast system capable of realizing a multicast operation with high reliability.

Also, according to the present invention, the check points for carrying out the check event operations can be set up at any desired positions in which the master processor and the slave processors cooperatively operates, so that the fault detection accuracy can be set to any desired level according to the reliability required for the system.

Also, the present invention is capable of being implemented in any multi-processor system easily, without affecting the system network configuration or the processor configuration.

It is to be noted that in the first to fifth embodiments described above the processor1-0 is chosen as the master processor and the remaining processors 1-1 to 1-n are chosen as the slave processors, but in an actual multi-processor system, which processor is going to be the master processor is not necessarily fixed, so that any one of the processors 1-0 to 1-n can be regarded as the master processor while the other processors are regarded as the slave processors.

Besides those already mentioned above, many modifications and variations of the above embodiments may be made without departing from the novel and advantageous features of the present invention. Accordingly, all such modifications and variations are intended to be included within the scope of the appended claims.

What is claimed is:

1. A multi-processor system, comprising:
   a master processor for executing a program;
   a plurality of slave processors which are executing the program cooperatively with the master processor; and
   multicast operation means for carrying out a multicast operation between the master processor and the slave processors, including:
   first memory means for storing multicast data to be transferred from the master processor to the slave processors;
   second memory means for storing control data provided in correspondence with the slave processors;
   third memory means for storing multicast identification data-for identifying a multicast point in the program corresponding to the multicast data stored in the first memory means; and
   control means for controlling a transfer of the multicast data stored in the first memory means to the slave processors such that each of the slave processors obtains desired multicast data for desired multicast point according to the multicast identification data stored in the third memory means, and a number of slave processors which has already obtained the desired multicast data is monitored according to the control data stored in the second memory means.

2. The system of claim 1, wherein the control data stored in the second memory means are initially provided in a number equal to a number of slave processors involved in the multicast operation for the multicast point indicated by the multicast identification data stored in the third memory means.

3. The system of claim 2, wherein the control means removes one of the control data whenever one of the slave processors obtains the multicast data stored in the first memory means as the desired multicast data for the desired multicast point.

4. The system of claim 2, wherein each one of the control data stored in the second memory means distinctly identify a corresponding one of the slave processors.

5. A multi-processor system comprising:
   a master processor for executing a program; a plurality of slave processors for executing the program cooperatively with..the master processor; and
   multicast operation means for carrying out a multicast operation between the master processor and the slave processors, including:
   first memory means for storing multicast data to be transferred from the master processor to the slave processors;
   second memory means for storing control data provided in correspondence with the slave processors;
   third memory means for storing. multicast identification data for identifying a multicast point in the program corresponding to the multicast data stored in the first memory means; and
   control means for controlling a transfer of the multicast data stored in the first memory means to the slave processors such that each of the slave processors obtains desired multicast data for desired multicast point according to the multicast identification data stored in the third memory means, and a number of slave processors which has already obtained the desired multicast data is monitored according to the control data stored in the second memory means, wherein the master processor and slave processors form a loosely linked type system without a shared memory commonly shared by the master processor and the slave processors.

6. A multi-processor system comprising:
   a master processor for executing a program;
   a plurality of slave processors for executing the program cooperatively with the master processor; and
   multicast operation means for carrying out a multicast operation between the master processor and the slave processors, including:
   first memory means for storing multicast data to be transferred from the master processor to the slave processors;
   second memory means for storing control data provided in correspondence with the slave processors;
   third memory means for storing multicast identification data for identifying a multicast point in the program corresponding to the multicast data stored in the first memory means; and
   control means for controlling a transfer of the multicast data stored in the first memory means to the slave processors such that each of the slave processors obtains desired multicast data for desired multicast point according to the multicast identification data stored in the third memory means, and a number of slave processors which has already obtained the desired multicast data is monitored according to the control data stored in the second memory means, wherein the master processor and slave processors form a densely linked type system including a shared memory commonly shared by the master processor and the slave processors.

7. A multi-processor system comprising:
   a master processor for executing a program;
   a plurality of slave processors for executing the program cooperatively with the master processor; and
   multicast operation means for carrying out a multicast operation between the master processor and the slave processors, including:
   first memory means for storing multicast data to be transferred from the master processor to the slave processors;
   second memory means for storing control data provided in correspondence with the slave processors;
   third memory means for storing multicast identification data for identifying a multicast point in the program corresponding to the multicast data stored in the first memory means; and
   control means for controlling a transfer of the multicast data stored in the first memory means to the slave processors such that each of the slave processors obtains desired multicast data for desired multicast point according to the multicast identification data stored in the third memory means, and a number of slave processors which has already obtained the desired multicast data is monitored according to the control data stored in the second memory means, wherein the multicast operation means is connected with the master processor and the slave processors through a dedicated transmission line different from a transmission line for mutually connecting the master processor and the slave processors.

8. A multi-processor system, comprising:
a master processor for executing a program;
a plurality of slave processors which are executing the program cooperatively with the master processor; and
check event operation means for carrying out a check event operation between the master processor and the slave processors, including:
first memory means for storing check data provided in correspondence with the slave processors;
second memory means for storing event identification data for identifying a check point in the program corresponding to the check data stored in the first memory means; and
control means for controlling the check event operation such that each of the slave processors checks a present check point according to the event identification data stored in the second memory means, and a number of slave processors which has already checked the present check point is monitored according to the check data stored in the first memory means.

9. The system of claim 8, wherein the check data stored in the first memory means are initially provided in a number equal to a number of slave processors involved in the check event operation for the check point indicated by the event identification data stored in the second memory means.

10. The system of claim 9, wherein the control means removes one of the check data whenever one of the slave processors checks the check point indicated by the event identification data stored in the second memory means as the present check point.

11. The system of claim 9, wherein each one of the check data stored in the first memory means distinctly identify a corresponding one of the slave processors.

12. A multi-processor system comprising:
a master processor for executing a program;
a plurality of slave processors for executing the program cooperatively with the master processor; and
check event operation means for carrying out a check event operation between the master processor and the slave processors, including:
first memory means for storing check data provided in correspondence with the slave processors;
second memory means for storing event identification data for identifying a check point in the program corresponding to the check data stored in the first memory means; and
control means for controlling the check event operation such that each of the slave processors checks a present check point according to the event identification data stored in the second memory means, and a number of slave processors which has already checked the present check point is monitored according to the check data stored in the first memory means, wherein the master processor and the slave processors form a loosely linked type system without a shared memory commonly shared by the master processor and the slave processors.

13. A multi-processor system comprising:
a master processor for executing a program;
a plurality of slave processors for executing the program cooperatively with the master processor; and
check event operation means for carrying out a check event operation between the master processor and the slave processors, including:
first memory means for storing check data provided in correspondence with the slave processors;
second memory means for storing event identification data for identifying a check point in the program corresponding to the check data stored in the first memory means; and
control means for controlling the check event operation such that each of the slave processors checks a present check point according to the event identification data stored in the second memory means, and a number of slave processors which has already checked the present check point is monitored according to the check data stored in the first memory means, wherein the master processor and the slave processors form a densely linked type system including a shared memory commonly shared by the master processor and the slave processors.

14. A multi-processor system comprising:
a master processor for executing a program;
a plurality of slave processors for executing the program cooperatively with the master processor; and
check event operation means for carrying out a check event operation between the master processor and the slave processors, including:
first memory means for storing check data provided in correspondence with the slave processors;.
second memory means for storing event identification data for identifying a check point in the program corresponding to the check data stored in the first memory means; and
control means for controlling the check event operation such that each of the slave processors checks a present check point according to the event identification data stored in the second memory means, and a number of slave processors which has already checked the present check point is monitored according to the check data stored in the first memory means, wherein the check event operation means is connected with the master processor and the slave processors through a dedicated transmission line different from a transmission line for mutually connecting the master processor and the slave processors.

15. A multi-processor system comprising:
a master processor for executing a program;
a plurality of slave processors for executing the program cooperatively with the master processor; and
check event operation means for carrying out a check event operation between the master processor and the slave processors, including:
first memory means for storing check data provided in correspondence with the slave processors;
second memory means for storing event identification data for identifying a check point in the program corresponding to the check data stored in the first memory means; and
control means for controlling the check event operation such that each of the slave processors checks a present check point according to the event identification data stored in the second memory means, and a number of slave processors which has already checked the present check point is monitored according to the check data stored in the first memory means, wherein the check event operation means further includes third memory means for storing multicast data to be transferred from the master processor to the slave processor, and wherein the control means also controls a transfer of the multicast data stored in the third memory means to the slave processors such that each of the slave processors obtains the multicast data stored in third memory means as desired multicast data for desired multicast point whenever said each of the slave processors checks the present check point according to the event identification data stored in the second memory means.

16. A method of multicast operation in a multiprocessor system formed by a master processor, a plurality of slave processors cooperatively operating with the master processor, and multicast control means for carrying out a multicast operation, comprising the steps of:
transferring a multicast request message from the master processor to the multicast operation means;
storing multicast data to be transferred from the master processor to the slave processors in a first memory means provided in the multicast operation means, in response to a reception of the multicast request message from the master processor;
storing control data provided in correspondence with the slave processors in a second memory means provided in the multicast operation means, in response to the reception of the multicast request message from the master processor;
storing multicast identification data for identifying a multicast point in a program corresponding to the multicast data stored in the first memory means, in a third memory means provided in the multicast operation means, in response to the reception of the multicast request message from the master processor;
transferring a data read out request message from each of the slave processor to the multicast operation means; and
controlling a transfer of the multicast data stored in the first memory means to the slave processors such that each of the slave processors obtains desired multicast data for desired multicast point according to the multicast data, control data, and multicast identification data stored in-the multicast operation means, in response to a reception of the data read out request message transferred from said each of the slave processors.

17. The method of claim 16, wherein the control data stored in the multicast operation means are initially provided in a number equal to a number of slave processors involved in the multicast operation for the multicast point indicated by the multicast identification data stored in the third memory means.

18. The method of claim 17, wherein at the controlling step, one of the control data is removed whenever one of the slave processors receives the multicast data stored in the first memory means as the desired multicast data.

19. The method of claim 17, wherein each one of the control data stored in the second memory means distinctly identify a corresponding one of the slave processors.

20. A method of multicast operation in a multiprocessor system formed by a master processor, a plurality of slave processors cooperatively operating with the master processor, and multicast control means for carrying out a multicast operation, comprising the steps of:
transferring a multicast request message from the master processor to the multicast operation means;
storing multicast data to be transferred from the master processor to the slave processors in a first memory means provided in the multicast operation means, in response to a reception of the multicast request message from the master processor;
storing control data provided in correspondence with the slave processors in a second memory means provided in the multicast operation means, in response to a reception of the multicast request from the master processor;
storing multicast identification data for identifying a multicast point in a program corresponding to the multicast data stored in the first memory means, in a third memory means provided in the multicast operation means, in response to the reception of the multicast request message from the master processor;
transferring a data read out request message from each of the slave processors to the multicast operation means; and
controlling a transfer of the multicast data stored in the first memory means to the slave processors such that each of the slave processors obtains desired multicast data for desired multicast point according to the multicast data, control data, and multicast identification data stored in the multicast operation means, in response to a reception of the data read out request message transferred from each of the slave processors and, further comprising the steps to follow the step for transferring the multicast request message of:
inspecting a memorized content of the second memory means to check a presence of the control data for a previous multicast point; and
determining that one of the slave processors corresponding to a remaining one of the control data for the previous multicast point whose presence is checked at the inspecting step is malfunctioning.

21. The method of claim 20, wherein at the inspecting step, the memorized content of the second memory means is inspected for a predetermined number of times within a prescribed time out period before the method proceeds to the determining step.

22. A method of multicast operation in a multiprocessor system formed by a master processor, a plurality of slave processors cooperatively operating with the master processor, and multicast control means for carrying out multicast operation, comprising the steps of:
transferring a multicast request message from the master processor to the multicast operation means;
storing multicast data to be transferred from the master processor to the slave processors in a first memory means provided in the multicast operation means, in response to a reception of the multicast request message from the master processor;
storing control data provided in correspondence with the slave processors in a second memory means provided in the multicast operation means, in response to a reception of the multicast request from the master processor;

storing multicast identification data for identifying a multicast point in a program corresponding to the multicast data stored in the first memory means, and a third memory means provided in the multicast operation means, in response to the reception of the multicast request message from the master processor;

transferring a data read out request message from each of the slave processors to the multicast operation means; and controlling a transfer of the multicast data stored in the first memory means to the slave processors such that each of the slave processors obtains desired multicast data for desired multicast point according to the multicast data, control data, and multicast identification data stored in the multicast operation means, in response to a reception of the data read out request message transferred from each of the slave processors and, further comprising the steps to follow the step of transferring the data read out request message of:

(a) inspecting memorized contents of the second and third memory means to check a presence of the control data for a present multicast point and a matching of desired multicast point specified by the data read out request message and the present multicast point indicated by the multicast identification data stored in the third memory means, for a predetermined number of times within a prescribed time out period; and (b) determining that one of the slave processors corresponding to a remaining one of the control data for the present multicast point whose presence is checked at the step (a) after the prescribed time out period is malfunctioning, when the second memory means is found to be not empty and the multicast point indicated by the multicast identification data stored in the third memory means is found to be smaller than the desired multicast point specified by the data read out request message by one at the step (a) after the prescribed time out period.

23. The method of claim 22, further comprising the steps to follow the step (b) of:

(c) inspecting memorized contents of the second and third memory means to check a presence of the control data for the present multicast point and a matching of the desired multicast point specified by the data read out request message and the present multicast point indicated by the multicast identification data stored in the third memory means, for a predetermined number of times within a prescribed time out period; and (d) determining that the master processor is malfunctioning, when the second memory means is found to be empty and the multicast point indicated by the multicast identification data stored in the third memory means is found to be smaller than the desired multicast point specified by the data read out request message by one at the step (c) after the prescribed time out period.

24. The method of claim 23, further comprising the steps to follow the step (d) of:

(e) inspecting a memorized content of the third memory means to check a matching of the desired multicast point specified by the data read out request message and the present multicast point indicated by the multicast identification data stored in the third memory means; and (f) determining that one of the slave processors from which said data read out request message is originated is malfunctioning, when the multicast point indicated by the multicast identification data stored in the third memory means is found to be either one of being smaller than the desired multicast point specified by the data read out request by a value different from one and of being greater than the desired multicast point specified by the data read out request message at the step (e).

25. The method of claim 24, further comprising the steps to follow the step (f) of:

(g) inspecting a memorized content of the second memory means to check a presence of the control data for the present multicast point; and (h) determining that there is a mismatching between a number of the slave processors relevant to the present multicast point which is indicated by the multicast request message transferred from the the master processor and an actual number of the slave processors which transferred the data-read out request message for the present multicast point, when the second memory means is found to be empty at the step (g).

26. A method of check event operation in a multiprocessor system formed by a master processor, a plurality of slave processors cooperatively operating with the master processor, and check event operation means for carrying out a check event operation, comprising the steps of:

transferring a check event message from the master processor to the check event operation means;

storing check data provided in correspondence with the slave processors in a first memory means provided in the check event operation means, in response to a reception of the check event message from the master processor;

storing event identification data for identifying a check point in the program corresponding to the check data stored in the first memory means, in a second memory means provided in the check event operation means, in response to the reception of the check event message from the master processor;

transferring a check point pass message from each of the slave processor to the check event operation means; and controlling the check event operation such that each of the slave processors checks a present cheek point according to the check data and event Identification data stored in the check event operation means, in response to a reception of the check point pass message transferred from said each of the slave processors.

27. The method of claim 26, wherein the check data stored in the first memory means are initially provided in a number equal to a number of slave processors involved in the check event operation for the check point indicated by the event identification data stored in the second memory means.

28. The method of claim 27, wherein at the controlling step, one of the check data is removed whenever one of the slave processors checks the present check point.

29. The method of claim 27, wherein each one of the check data stored in the first memory means distinctly identify a corresponding one of the slave processors.

30. A method of check event operation in a multiprocessor system formed by a master processor, a plurality of slave processors cooperatively operating with the master processor, and check event operation means for carrying out a check event operation, comprising the steps of:

transferring a check event message from the master processor to the check event operation means;

storing check data provided in correspondence with the slave processors in a first memory means provided in the check event operation means, in response to a reception of the check event message from the master processor;

storing event identification data for identifying a check point in the program corresponding to the check data stored in the first memory means, in a second memory means provided in the check event operation means, in response to the reception of the check event message from the master processor;

transferring a check point pass message from each of the slave processors to the check event operation means; and controlling the check event operation such that each of the slave processors checks a present check point according to the check data and event identification data stored in the check event operation means, in response to a reception of the check point pass message transferred from each of said slave processors, further comprising the steps to follow the step for transferring the check event message of:

inspecting a memorized content of the first memory means to check a presence of the check data for a previous check point; and determining that one of the slave processors corresponding to a remaining one of the check data for the previous check point whose presence is checked at the inspecting step is malfunctioning.

31. The method of claim 30, wherein at the inspecting step, the memorized content of the first memory means is inspected for a predetermined number of times within a prescribed time out period before the method proceeds to the determining step.

32. A method of check event operation in a multi-processor system formed by a master processor, a plurality of slave processors cooperatively operating with the master processor, and check event operation means for carrying out a check event operation, comprising the steps of:

transferring a check event message from the master processor to the check event operation means;

storing check data provided in correspondence with the slave processors in a first memory means provided in the check event operation means, in response to a reception of the check event message from the master processor;

storing event identification data for identifying a check point in the program corresponding to the check data stored in the first memory means, in a second memory means provided in the check event operation means, in response to the reception of the check event message from the master processor;

transferring a check point pass message from each of the slave processors to the check event operation means; and controlling the check event operation such that each of the slave processors checks a present check point according to the check data and event identification data stored in the check event operation means, in response to a reception of the check point pass message transferred from each of said slave processors, further comprising the steps to follow the step for transferring the check point pass message of:

(a) inspecting memorized contents of the first and second memory means to check a presence of the check data for the present check point and a matching of a check point specified by the check point pass message and the present check point indicated by the event identification data stored in the second memory means, for a predetermined number of times within a prescribed time out period; and (b) determining that one of the slave processors corresponding to a remaining one of the check data for the present check point whose presence is checked at the step (a) after the prescribed time out period is malfunctioning, when the first memory means is found to be not empty and the check point indicated by the event identification data stored in the second memory means is found to be smaller than the check point specified by the check point pass message by one at the step (a) after the prescribed time out period.

33. The method of claim 32, further comprising the steps to follow the step (b) of:

(c) inspecting memorized contents of the first and second memory means to check a presence of the check data for the present check point and a matching of the check point specified by the check point pass message and the present check point indicated by the event identification data stored in the second memory means, for a predetermined number of times within a prescribed time out period; and (d) determining that the master processor is malfunctioning, when the first memory means is found to be empty and the check point indicated by the event identification data stored in the second memory means is found to be smaller than the check point specified by the check point pass message by one at the step (c) after the prescribed time out period.

34. The method of claim 33, further comprising the steps to follow the step (d) of:

(e) inspecting a memorized content of the second memory means to check a matching of the check point specified by the check point pass message and the present check point indicated by the event identification data stored in the second memory means; and (f) determining that one of the slave processors from which said check point pass message is originated is malfunctioning, when the check point indicated by the event identification data stored in the second memory means is found to be either one of being smaller than the check point specified by the check point pass message by a value different from one and of being greater than the check point specified by the check point pass message at the step (e).

35. The method of claim 34, further comprising the steps to follow the step (f) of:

(g) inspecting a memorized content of the first memory means to check a presence of the check data for the present check point; and (h) determining that there is a mismatching between a number of the slave processors relevant to the present check point which is indicated by the check event message transferred from the the master processor and an actual number of the slave processors which transferred the check point pass message for the present check point, when the first memory means is found to be empty at the step (g).

36. A method of check event operation in a multi-processor system formed by a master processor, a plurality of slave processors cooperatively operating with the master processor, and check .event operation means for carrying out a check event operation, comprising the steps of:

transferring a check event message from the master processor to the check event operation means;

storing check data provided in correspondence with the slave processors in a first memory means provided in the check event operation means, in response to a reception of the check event message from the master processor;

storing event identification data for identifying a check point in the program corresponding to the check data stored in the first memory means, in a second memory means provided in the check event operation means, in response to the reception of the check event message from the master processor;

transferring a check point pass message from each of the slave processors to the check event operation means; and controlling the check event operation such that each of the slave processors checks a present check point according to the check data and event identification data stored in the check event operation means, in response to a reception of the check point pass message transferred from each of said slave processors, further comprising the step of storing multicast data to be transferred from the master processor to the slave processor in a third memory means provided in the check event operation means, and wherein at the controlling step, the check event operation is also controlled such that each of the slave processors also obtains the multicast data stored in the third memory means as desired multicast data for desired multicast point, whenever one of the slave processors checks the present point according to the check data and event identification data stored in the check event operation means in response to a reception of the check point pass message transferred from said each of the slave processors.

* * * * *